United States Patent [19]

Tsujiuchi et al.

[11] Patent Number: 5,343,410
[45] Date of Patent: Aug. 30, 1994

[54] METHOD FOR DIVISIONAL MEASUREMENT OF OBJECT SURFACE, AND METHOD FOR JOINING OBJECT SURFACE SUB-AREAS MEASURED BY SAME

[75] Inventors: Jumpei Tsujiuchi, Kanagawa; Katsuyuki Okada, Tokyo, both of Japan

[73] Assignee: Fuji Photo Optical Co., Ltd., Omiya, Japan

[21] Appl. No.: 852,595

[22] Filed: Mar. 17, 1992

[30] Foreign Application Priority Data

| Mar. 19, 1991 | [JP] | Japan | 3-105015 |
| Mar. 19, 1991 | [JP] | Japan | 3-105016 |
| Mar. 19, 1991 | [JP] | Japan | 3-105017 |
| Mar. 19, 1991 | [JP] | Japan | 3-105018 |
| Mar. 19, 1991 | [JP] | Japan | 3-105019 |

[51] Int. Cl.⁵ ........................... G06F 15/20
[52] U.S. Cl. ........................... 364/525; 382/42
[58] Field of Search .............. 346/1.1; 364/525, 561, 364/564; 382/42

[56] References Cited

U.S. PATENT DOCUMENTS

| T930,002 | 1/1975 | Barnea et al. | 382/42 |
| 4,829,373 | 5/1989 | Leberl et al. | 358/107 X |
| 4,849,912 | 7/1989 | Leberl et al. | 358/107 X |
| 4,897,678 | 1/1990 | Leberl et al. | 354/293 X |
| 4,975,779 | 12/1990 | Boudry | 358/244 |
| 5,132,701 | 7/1992 | Stephenson et al. | 346/1.1 |
| 5,132,938 | 7/1992 | Walters | 367/48 X |
| 5,140,341 | 8/1992 | Fiscella et al. | 346/1.1 |
| 5,159,455 | 10/1992 | Cox et al. | 358/213.11 |

Primary Examiner—Edward R. Cosimano
Attorney, Agent, or Firm—Jordan and Hamburg

[57] ABSTRACT

Each sub-area of an object surface is measured with a partial overlapping on the peripheral edges of at least adjacent sub-areas. Surface state data of each sub-area is acquired and calculated to produce a reconstructed image. The images of the reconstructed sub-areas are made to partially overlap, and differences between the reconstructed images at selected points within the overlapped region are determined. A predetermined calculation is performed to determine coefficients, for altering the relative alignment of the reconstructed images, which minimize the differences. The reconstructed images are contiguously joined together by application of the coefficients. Thus, boundaries between the reconstructed images are joined contiguously into an accurate form.

6 Claims, 21 Drawing Sheets

FIG. 2
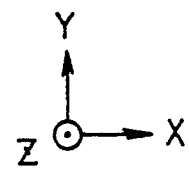
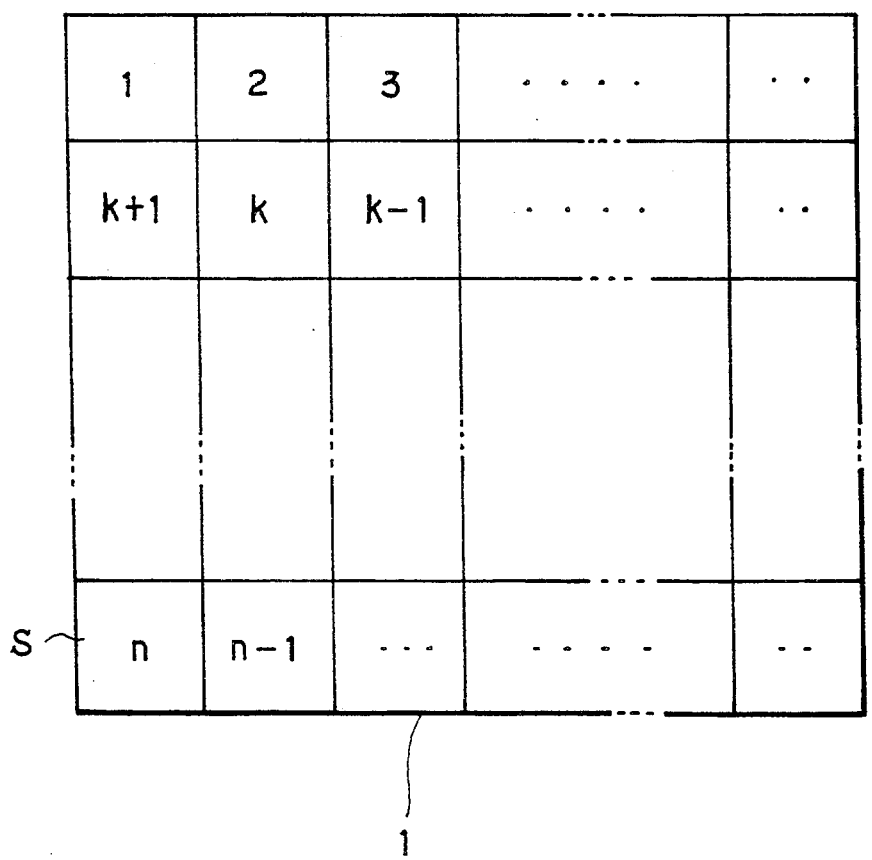

F I G . 3
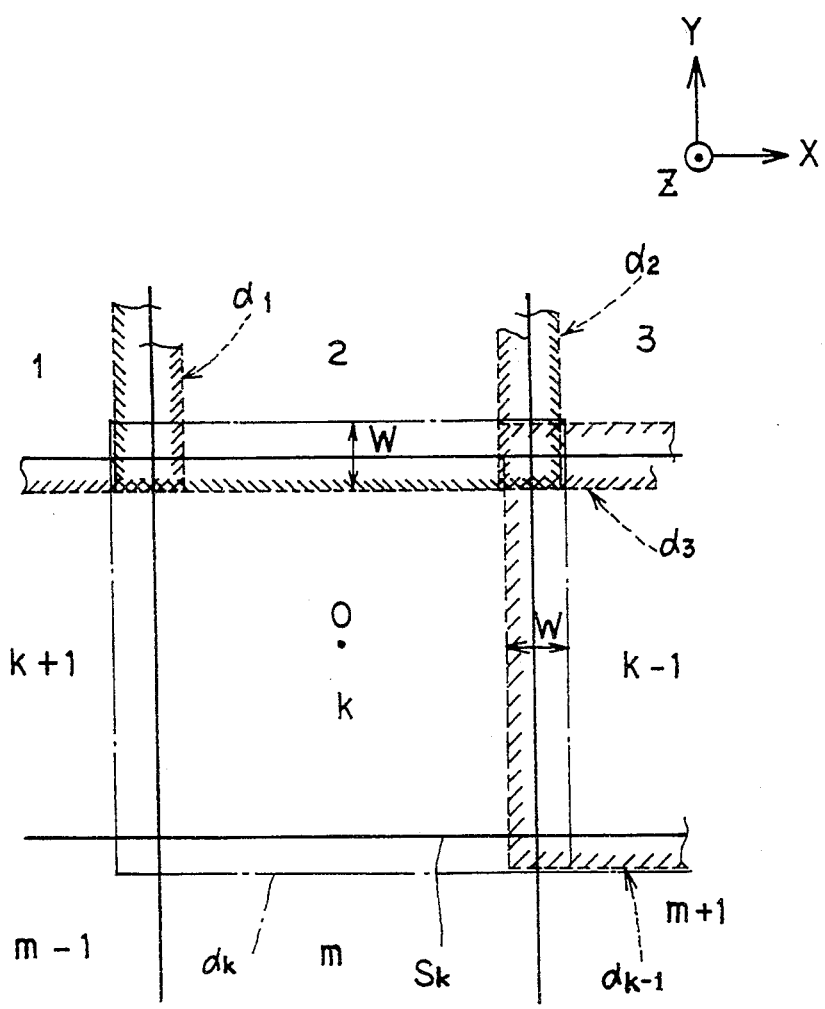

FIG. 4
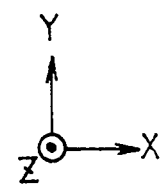
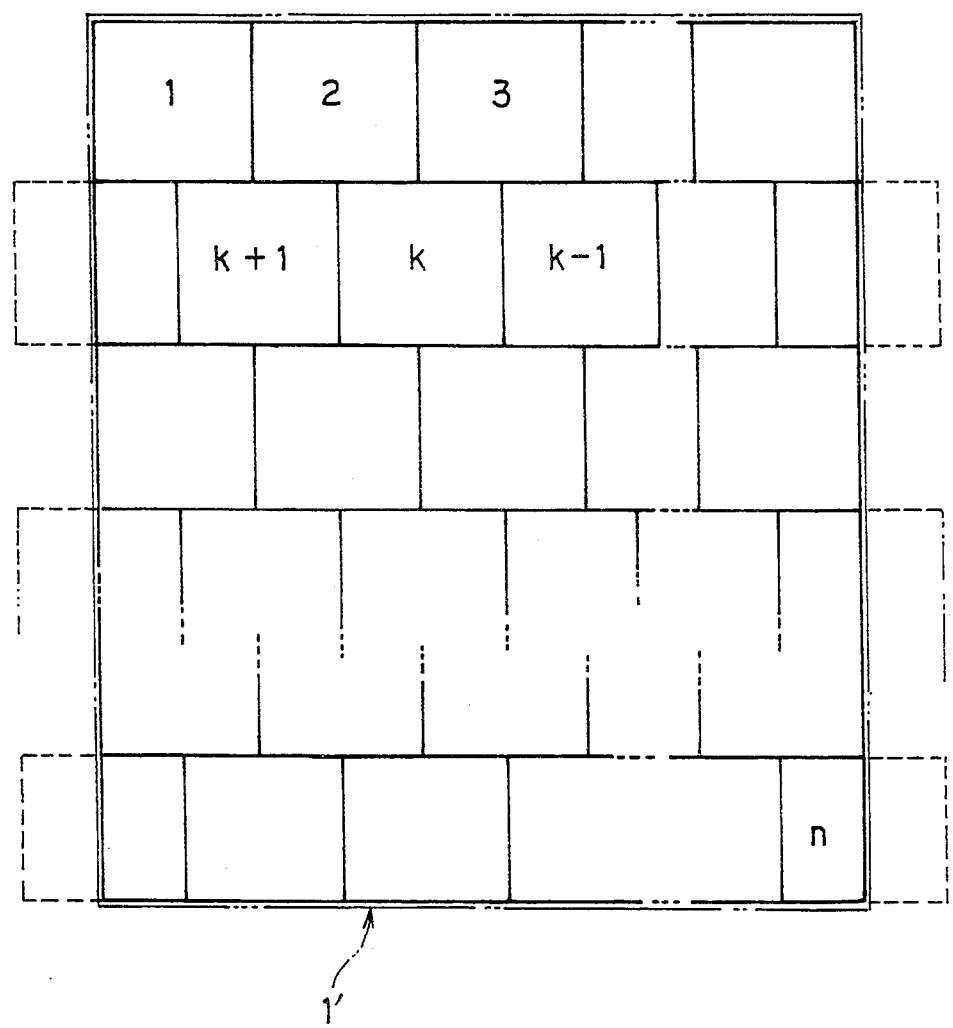

F I G. 12
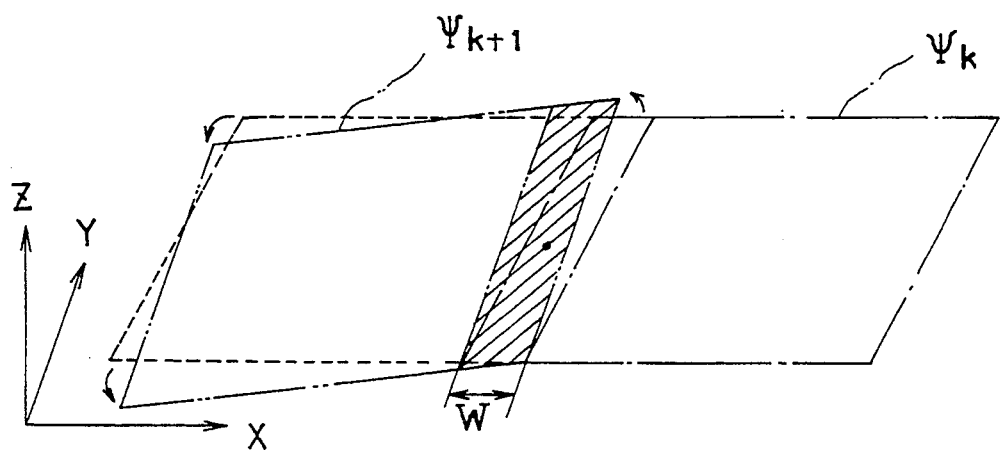
F I G. 13
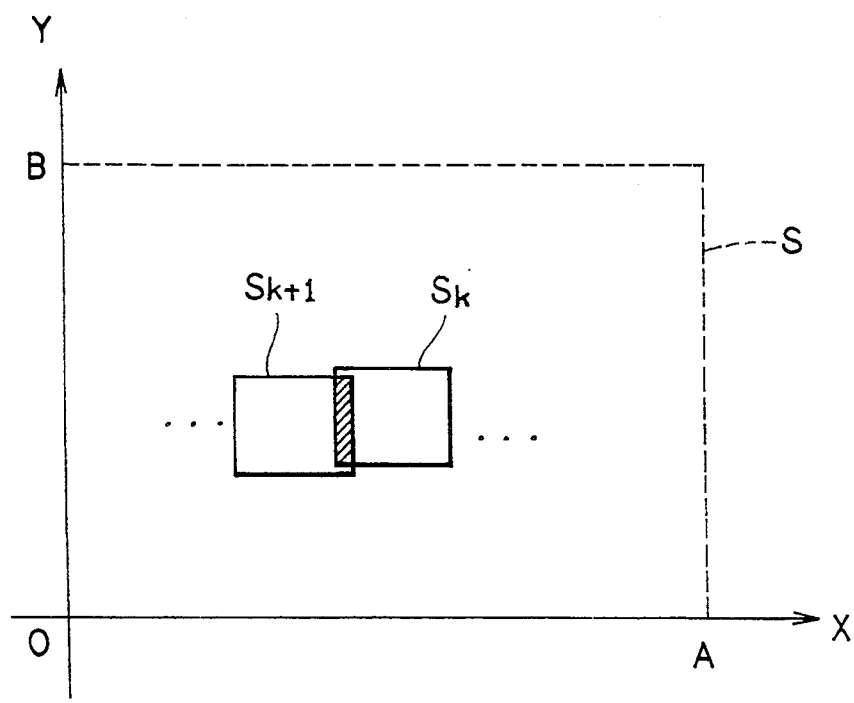

F I G . 16
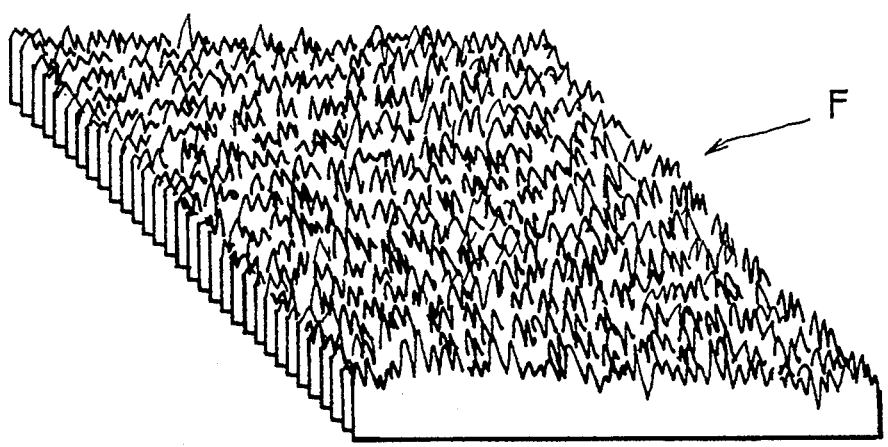

METHOD FOR DIVISIONAL MEASUREMENT OF OBJECT SURFACE, AND METHOD FOR JOINING OBJECT SURFACE SUB-AREAS MEASURED BY SAME

BACKGROUND OF THE INVENTION

The present invention relates to a method for measuring the surface state such as structure, form or the like of an object by using one of a variety of measuring apparatuses such as interferometer, moire fringe measuring instrument, etc. and more particularly to a method for divisional measurement of an object surface in which its surface is imaginarily divided into a plurality of fractions in case its whole surface area is wider than the measuring aperture of a measuring apparatus used and each of the surface fractions is measured.

Also, the present invention relates to a method for contiguously joining together the plurality of object surface fractions of an object after subjected to the divisional measurement in case the object has a whole surface area wider than the measuring aperture of a surface state measuring apparatus used.

For highly accurate measurement of the state of a plain or curved surface (referred to hereinafter as "object surface") of various kinds of parts (hereinafter referred to as "object"), a variety of apparatuses (hereinafter referred to as "form measuring apparatus") using an interferometer or the like has been proposed which can determine the surface state of the object from the pattern of an interference fringe or the like formed by the measuring apparatus during the measurement. However, the area the form measuring apparatus can cover by one measurement is limited and so an object surface wider than the measuring aperture of the apparatus must be subjected to a plurality of measurements.

A solution has been proposed as known from the disclosure in Unexamined Japanese Patent Publication Nos. Hei 2-259509 and 2-259510. This solution is such that when measuring a large object such as seen in FIG. 1 having a wide surface, the object surface is imaginarily divided into a plurality of fractions (hereinafter referred to as "sub-areas") and each of these sub-areas is measured. Namely, this method permits to provide an image of the whole surface of a large object, by reconstructing from the data obtained by the measurement of an image (hereinafter referred to as "reconstructed image") representing the state of each sub-area, and joining together and integrating the reconstructed images.

The method for such divisional measurement can be used to obtain accurate measured data of each of the sub-areas. However, simple joining of the sub-area images reconstructed from the measured data is not sufficient for determining the state of the object surface but the sub-areas are discontinuous at their junctions in many cases so that it is difficult to obtain an accurate image of the whole object surface corresponding to a real state. In addition, when the actual measurement is repeatedly done of the sub-areas, the shift of the measurement from one of the sub-areas to another will possibly cause (1) minute vertical oscillation of the object surface; (2) failure in recognition of the sub-area currently under measurement; (3) large error in boundary between sub-areas; and (4) missing of measurement during repetition of the measurement.

When, for example, a glass plate of 1 cm in thickness is measured by repeating the measurement for each of the sub-areas of this object, a temperature change as small as 1° C. of the surface will result in an expansion or shrinkage of the order of 0.1 μm since the glass plate has a coefficient of linear thermal expansion of $1 \times 10^{-5}$ [deg$^{-1}$]. Thus, it is essential that the measurement should be done as efficiently and rapidly as possible. More particularly, the testing person's temperature will possibly have a delicate influence causing a non-negligible change in expansion of the object surface.

SUMMARY OF THE INVENTION

Accordingly, the present invention has an object to overcome the above-mentioned drawbacks of the prior art by providing a method for divisional measurement of an object in which a quality image of a large object like of which the surface area is wider than the measuring aperture of a state measuring apparatus can be produced from sub-area images with any discontinuity effectively prevented from taking place at the junctions between the reconstructed sub-area images.

Also the present invention has another object to provide a method for joining measured sub-areas in which sub-area images reconstructed from the data obtained by the measurement of each of the sub-areas are contiguously joined together to produce an accurate image of the whole object surface, composed of the sub-area images and which is infinitely approximate to the real state of the object surface.

The above object is attained by providing a method for divisional measurement of an object having a surface wider than the measuring aperture of a form measuring means used, by measuring each of a plurality of sub-areas resulting from imaginary division of the object surface, comprising the steps of setting each of the sub-areas so as to partially overlap the circumferential edges of the adjacent sub-areas; effecting a predetermined measurement of each of the sub-areas; and effecting a further predetermined measurement of four-corner regions including all the corners of the adjacent sub-areas.

Also the above object is attained by providing a method for joining together the measured sub-areas of an object to compose the state of the whole object surface in which the object surface is imaginarily divided into a plurality of sub-areas, the state of each of the sub-areas and is measured and then the sub-areas are joined together to compose the state of the whole object surface, wherein the measured sub-areas are joined together in such a manner that the error caused by the gradient between the reconstructed sub-area images thus joined together is smaller than the mean value of the irregularities of the sub-area images reconstructed from the measured data of the object surfaces within the sub-areas.

Another aspect of the preceding method according to the present invention is that the measured sub-areas are joined together in such a manner that the adjacent ones of the sub-areas are superposed on each other within a range of 3% to 30% in area of each of the sub-areas.

BRIEF DESCRIPTION OF THE DRAWINGS

FIG. 2 is an explanatory drawing of sub-areas of an object surface which are to be measured by a first embodiment of the present invention;

FIG. 3 is an explanatory drawing of the first embodiment of the present invention;

FIG. 4 is an explanatory drawing of sub-areas of an object surface which are to be measured by a second embodiment of the present invention;

FIG. 12 is an explanatory drawing showing the reconstructed images about to be joined by the joining method according to the present invention;

FIG. 13 is an explanatory drawing showing the geometrical relation, in the whole object surface, between the sub-areas to be joined together by the joining method according to the present invention;

FIG. 16 is a perspective view of an image showing a whole surface reconstructed from the sub-areas according to the present invention;

FIG. 24 is a block diagram showing the connection of the controlling means according to the present invention with the electrical parts and the like.

DETAILED DESCRIPTION OF THE PREFERRED EMBODIMENTS

The present invention will be better understood from the ensuing description made, by way of example, of the embodiments of present invention with reference to the drawings.

FIG. 2 shows the whole surface 1 of a large object to be measured by the method of divisional measurement according to a preferred first embodiment of the present invention, the rectangular object surface being imaginarily divided into a number n of square sub-areas S.

FIG. 3 shows the method of divisional measurement according to a first embodiment of the present invention. For this embodiment, one of the sub-areas, that is, a k-th sub-area $S_k$ will be described.

The measurement region $a_k$ for k-th sub-area $S_k$ takes the center O of the sub-area $S_k$ as the center of measurement and includes extensions over a predetermined range W/2 from all the four sides of the sub-area $S_k$ in the X- and Y-directions, respectively, onto the circumferential edges of a total of eight sub-areas surrounding the sub-area $S_k$ from the X- and Y-directions, that is, the first, second, third, (k−1)th, (k+1)th, (m−1)th (m>k), m−th and (m+1)th sub-areas. The range W/2 can be chosen to provide an overlapping region with an area of 3 to 30% of the sub-areas. The region $a_k$ can be measured by means of a form measuring apparatus (not shown).

A predetermined calculation is made between the data obtained with the measurement of the sub-area $S_k$ and those of, especially, the second measurement region $a_2$ and (k−1)th measurement region $a_{k-1}$ among the already measured first region $a_1$, second region $a_2$, third region $a_3$ and (k−1)th region $a_{k-1}$. Thus, the overlapping region of a reconstructed surface image $(G_k)$ obtained from the data acquired with the measurement of the measurement region $a_k$ and a reconstructed image $(G_2)$ of the second measurement region $a_2$ on each other can be contiguously joined together. Likewise, the overlapping area of the reconstructed images $(G_k)$ and $(G_{k-1})$ can be contiguously joined together.

It should be noted that the description made here of the measurement of the k-th sub-area $S_k$ is also true for the measurement of all the other sub-areas.

FIG. 4 shows the whole surface 1' of a large object under measurement by the method of divisional measurement according to a second embodiment of the present invention. This surface 1' consists of a number n of sub-areas. The sub-areas in one line are disposed as displaced a half length of one side of the sub-area from those in adjacent lines.

Figure 1:
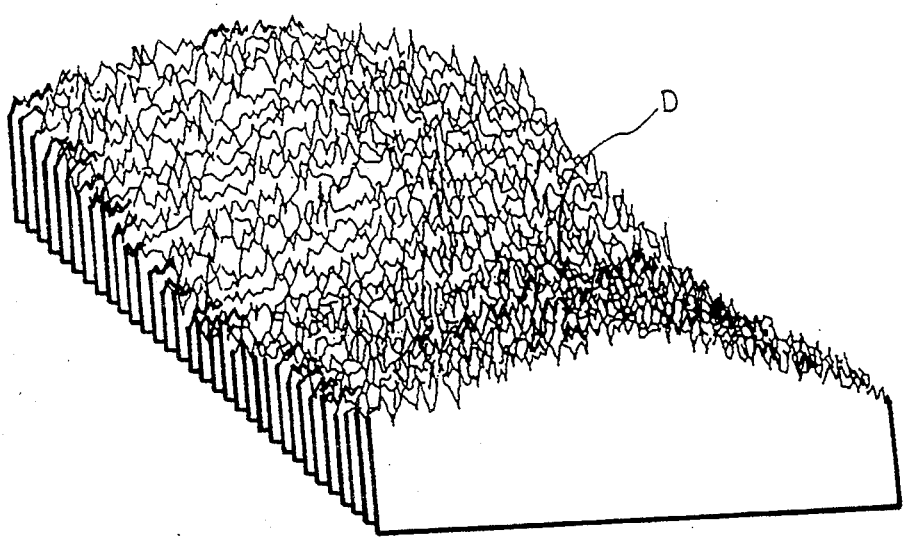
FIG. 1 is a perspective view wholly showing a surface image reconstructed by a conventional method.
Figure 5:
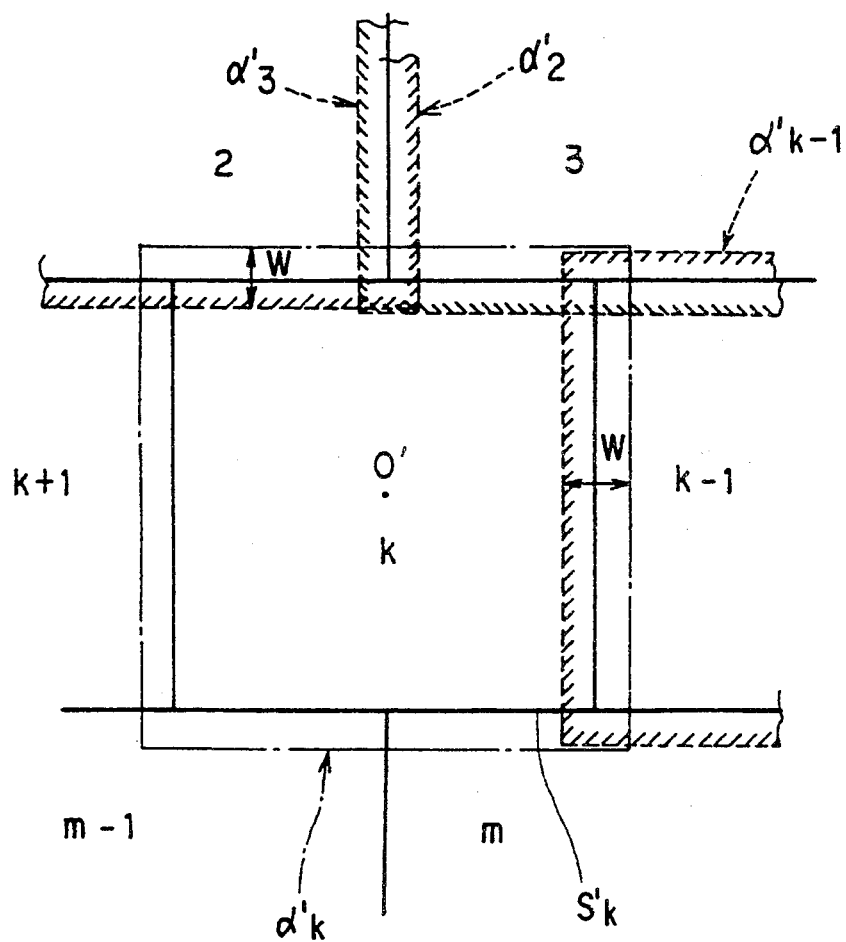
FIG. 5 is an explanatory drawing of the second embodiment of the present invention.

FIG. 5 shows the method of divisional measurement according to the second embodiment. For this second embodiment, one of the sub-areas, that is, a k-th sub-area $S'_k$ will be described.

The measurement region $a'_k$ for k-th sub-area $S'_k$ takes the center O' of the sub-area $S'_k$ as the center of measurement and includes extensions over a predetermined range W/2 from all the four sides of the sub-area $S'_k$ in the X- and Y-directions, respectively, onto the circumferential edges of a total of six sub-areas, that is, the second, third, (k−1)th, (K+1)th, (m−1)th (m>k) and m-th sub-areas. This measurement region $a'_k$ can be measured by a form measuring apparatus (not shown).

A predetermined calculation is made between the data acquired with the measurement of the region $a'_k$ and those of, especially, the second measurement region $\alpha'_2$ and (k−1)th measurement region $\alpha'_{k-1}$ among the already measured second region $\alpha'_2$, third region $\alpha'_3$ and (k−1)th region $\alpha'_{k-1}$.

Thus, the overlapping region of the reconstructed images can be contiguously joined together based on the data thus obtained.

Next, a third embodiment of the present invention will be described below.

Figure 6:
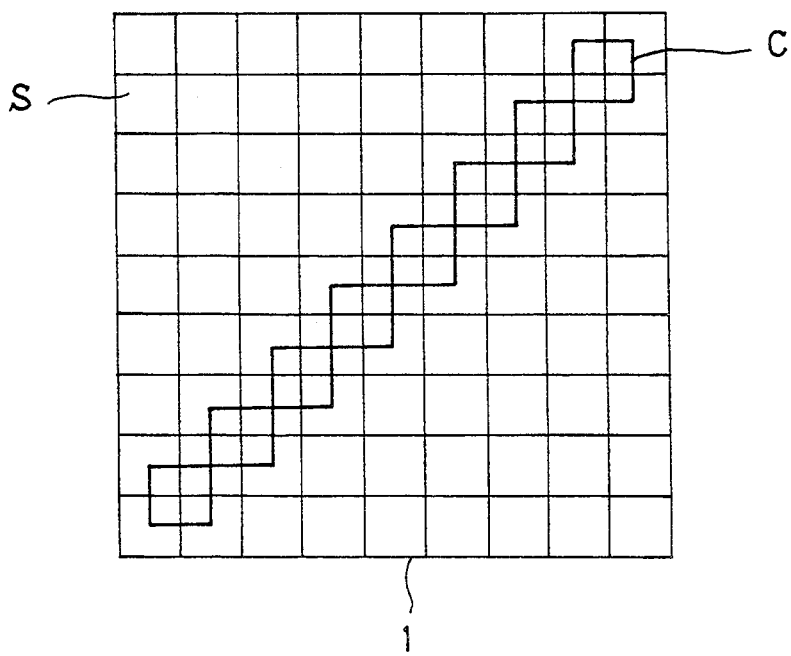
FIG. 6 is an explanatory drawing of sub-areas and four-corner regions in a third embodiment of the present invention.

In the third embodiment of method for divisional measurement, the measurements of the adjacent sub-areas S are done as in the first embodiment and then a predetermined four-corner region C including parts of four sub-areas as shown in FIG. 6 is measured.

Figure 7:
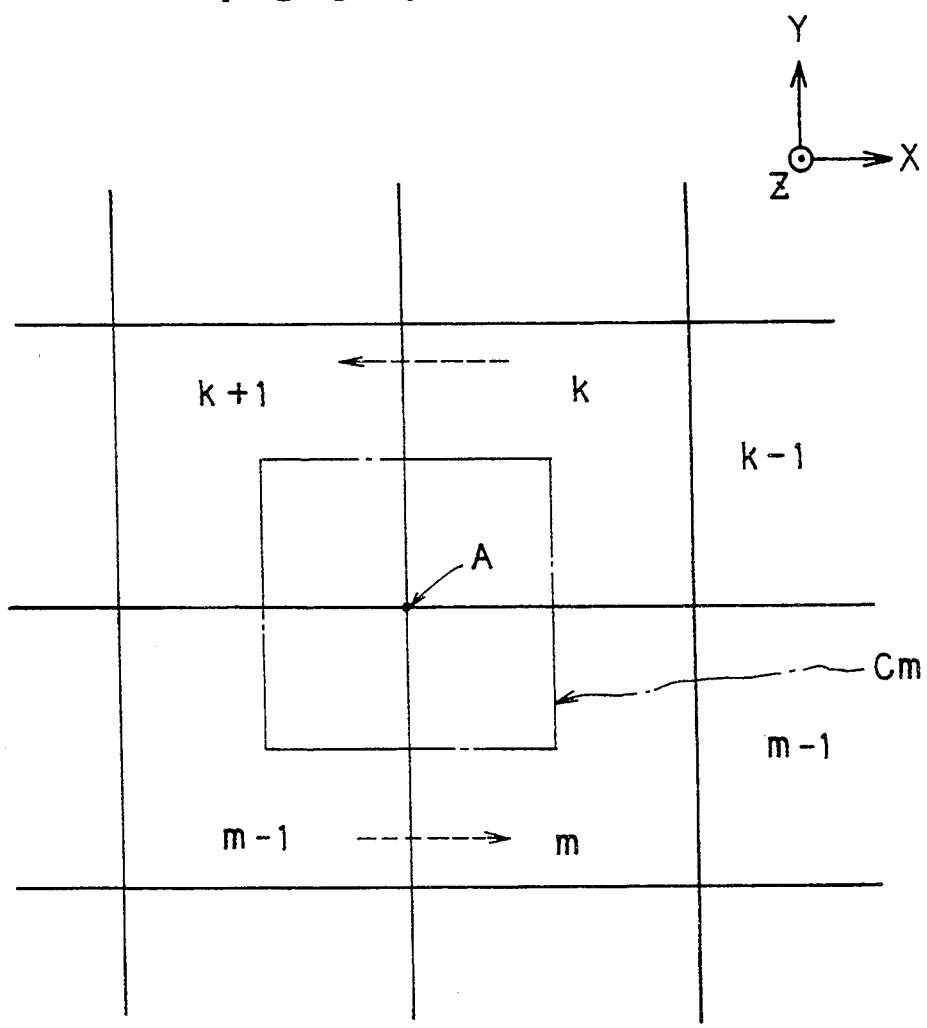
FIG. 7 is an explanatory drawing of the four-corner regions in the third embodiment of the present invention.

More particularly in this embodiment, after completion of a predetermined measurement of the m-th sub-area S, the center of measurement is set at the point A by shifting the form measuring apparatus (and/or the object under measurement) a half of the side length of one sub-area as shown in FIG. 7 and then a predetermined range (L×L) $C_m$ of the four sub-areas, that is, the k-th, (K+1)th, (m−1)th and m-th sub-areas, are measured.

A predetermined calculation is done on the measured data of the four-corner region $C_m$ and those of the four sub-areas to further smooth the regions of the reconstructed images of the four sub-areas which are near the point A.

Figure 8:
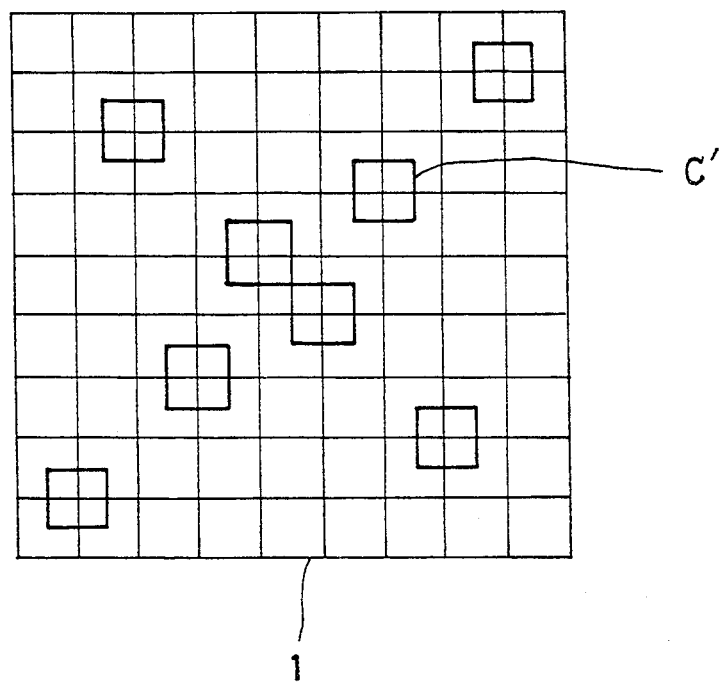
FIG. 8 is an explanatory drawing of sub-areas and four-corner regions in a fourth embodiment of the present invention.

FIG. 8 shows a fourth embodiment of the present invention.

In this fourth embodiment, the measurements of the adjacent sub-areas S are done as in the first embodiment and then a predetermined four-corner region C' including parts of four sub-areas as shown in FIG. 8 is measured.

Note that the four-corner region C' is selected at random for measurement but not regularly. For example, a criterion for error in the overlapping regions of the adjacent sub-areas may be defined before each measurement so that sub-areas having the error in the overlapping regions which exceeds the criterion are measured as four-corner region in a predetermined manner.

In the first to fourth embodiments having been described above, the measurement regions are square ones, but of course they may be in the form of a circle and in other various forms.

In case a laser is used in the present invention, it should preferably be a He-Ne laser of 633 nm in wavelength, semiconductor laser of 880 nm in wavelength or the like.

Figure 9:
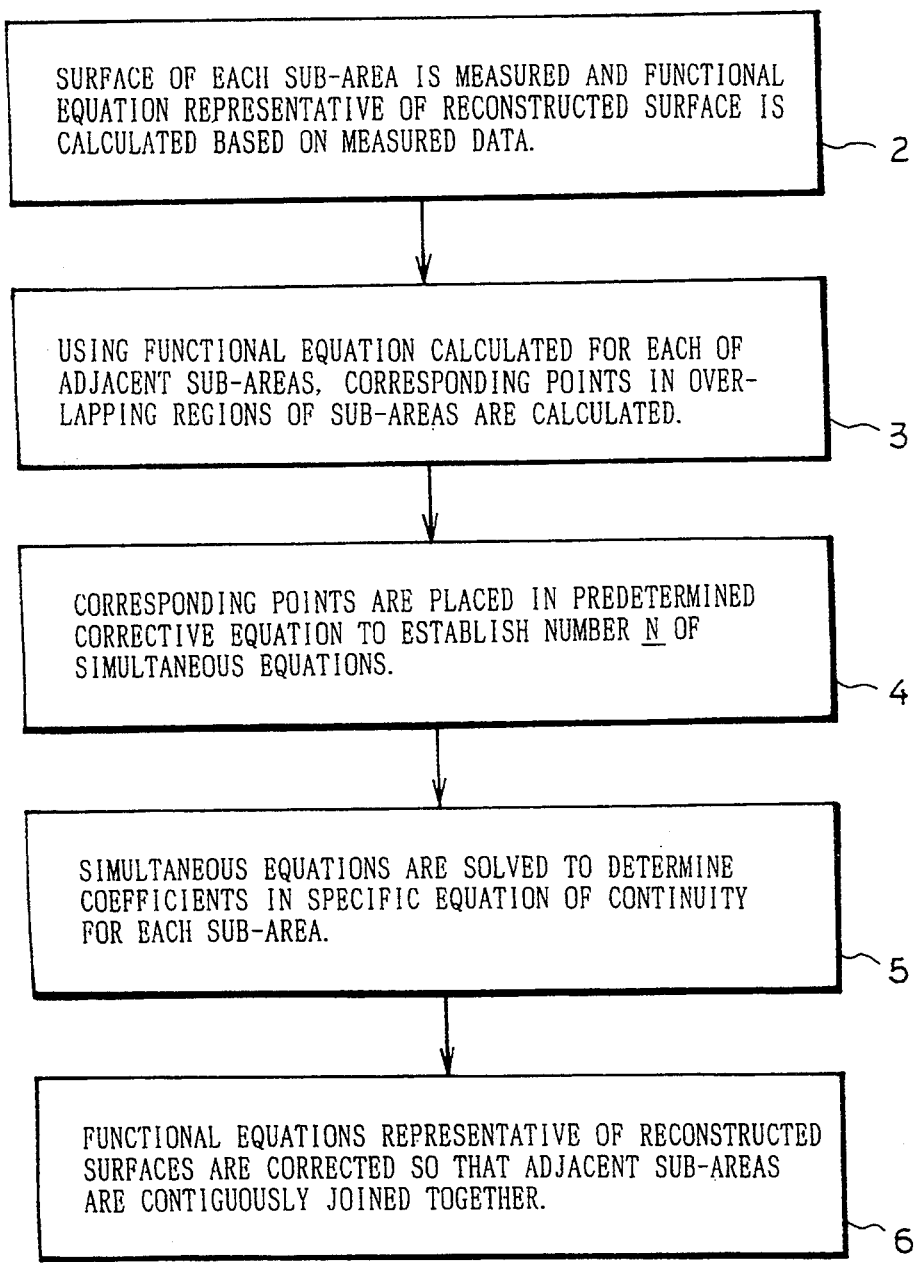
FIG. 9 is a flow chart showing the operations in the method of joining the sub-areas according to the present invention.

FIG. 9 is a flow chart of operations in a fifth embodiment of the present invention, which is a preferred method for joining together the sub-areas of an object surface. The flow of operations consists of the first step 2 to fifth step 6. Assume here that a relatively wide rectangular object surface consists of a number $\underline{n}$ of equal square sub-areas S. This embodiment will be discussed herebelow with respect to FIG. 10, concerning the connection of two sub-areas overlapping in a range of W on each other, namely, the k-th sub-area $S_k$ and (K+1)th sub-area $S_{n+1}$.

To measure the surface state of each sub-area $S_k$, the fifth embodiment uses a form measuring apparatus which will be described below. The form measuring apparatus used in the fifth embodiment has built therein a helium-neon (He-Ne) laser which projects a laser beam having a wavelength and a CCD (charge coupling device) camera to determine the surface state of the object surface from the interference fringe formed with the laser beam. However, the form measuring apparatus is not limited to a one having such a special arrangement in which the state or irregularity of the object surface is determined from the interference fringes produced by the laser beam. For example, the flatness, curving and the like of the object surface may be determined from a moire fringe formed by projecting an incoherent beam onto the object surface from an ordinary light source such as xenon lamp or the like.

(I) At the first step 2, each of the sub-areas of the object surface is measured with its edge so placed as to overlap the edge of the adjacent sub-area.

Figure 10:
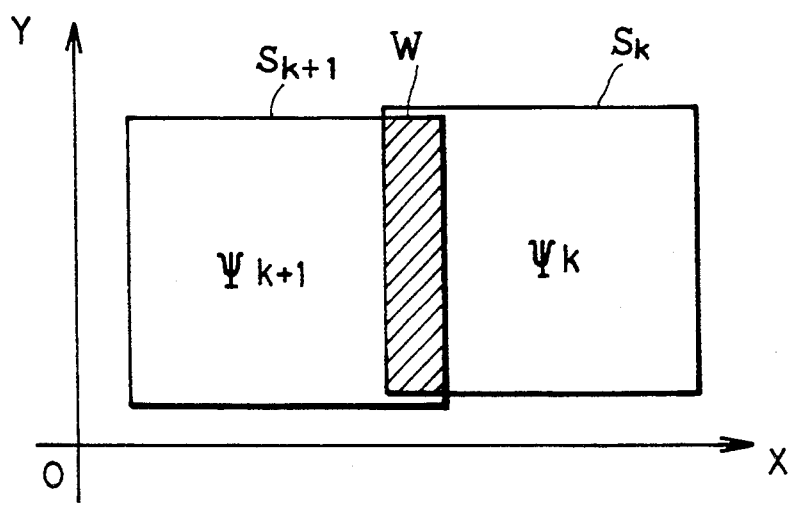
FIG. 10 is an explanatory drawing of the joining method according to the present invention, showing the surface overlapping of the sub-areas to be joined.
Figure 11:
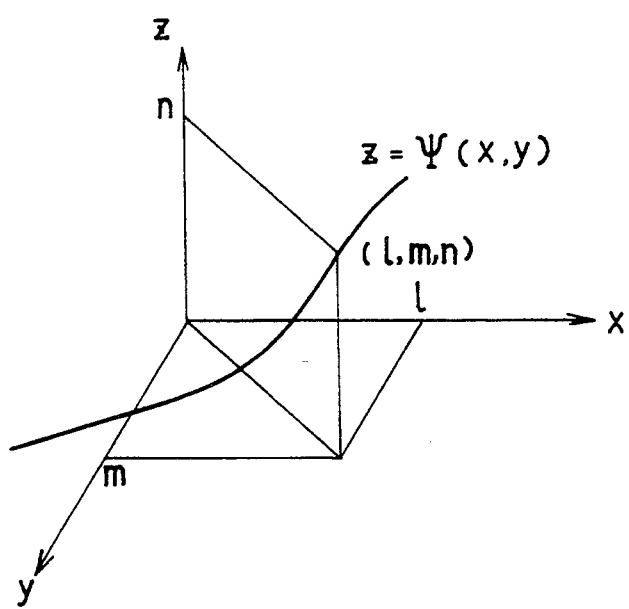
FIG. 11 is an explanatory drawing showing the irregularity of a part of the reconstructed image in a three-dimensional coordinate space.

A function $\Psi$ for display of the characteristic state of the object surface, namely, a reconstructed image, is calculated from the data obtained with this measurement by means of a microprocessor (not shown) or the like. In other words, the microprocessor is used to derive a function with which the reconstructed image of each sub-area can be displayed (graphically) on a display screen such as CRT. Thus, as functions $\Psi$ representing the state of the surfaces of, for example, the k-th sub-area ($S_k$) and (k+1)th sub-area ($S_{k+1}$) as shown in FIG. 10, namely, as functions $Z=\Psi(X, Y)$ representing the irregularities (Z) of the reconstructed image in a three-dimensional space (X, Y, Z) shown in FIG. 11, functions $\Psi_k$ and $\Psi_{k+1}$ are calculated.

The functions $\Psi_k$ and $\Psi_{k+1}$ are in different coordinate systems, respectively, having different origins. When the measurement is shifted from the sub-area ($S_k$) to the sub-area ($S_{k+1}$) in a next position, the object may possibly incur an infinitesimal displacement at a predetermined stage position in the vertical direction (Z) and horizontal direction (X, Y).

To avoid such displacement, the fifth embodiment adopts (1) transformation of the functions $\Psi_k$ and $\Psi_{k+1}$ into ones in a same coordinate system by using a predetermined equation of transformation and (2) optimization of the above-mentioned equation of transformation by using the method of least squares to minimize the difference (Z) in height (Z) between the surfaces at a same point shared by both the functions within the overlapping zones. The above will be discussed in further detail below.

(II) At the second step 3, the specific expressions of function ($\Psi_k$ and $\Psi_{K+1}$) calculated for the adjacent sub-areas (for example, $S_k$ and $S_{k+1}$) are (1) transformed into ones in a same coordinate system and (2) thereafter a same point is calculated in the overlapping regions of the reconstructed images depicted by the functions in the same coordinate system. Note that the same coordinate system O-X, Y is a reference for simultaneous display of all the object surfaces as shown in FIG. 13. In FIG. 13, the area S corresponds to the image of the whole object surface and consists of a number N of sub-areas $S_1, S_2, \ldots, S_N$.

(1) First, assume that the origin of the coordinate system O-x', y' being the reference for the sub-area $S_{k+1}$ is displaced $-x_0$ in the X-direction and $-y_0$ in the Y-direction in relation to the coordinate system O-x, y being the reference for the sub-area $S_k$. Both the functions are subjected to a transformation of coordinate using the following equations (a).

$$x = x' + x_0 \atop y = y' + y_0 \Bigg\} \quad (a)$$

Namely the following relation is established:

$$\Psi_k(x, y) = \Psi'_k(x' + x_0, y' + y_0) \atop \Psi_{k+1}(x - x_0, y - y_0) = \Psi'_{k+1}(x', y') \Bigg\} \quad (b)$$

It should be noted that to depict the whole object surface as one reconstructed image, it is necessary to transform the functions into ones in a same coordinate system. For simplicity of the explanation, the subsequent procedure are effected down to the last step without any transformation of the functions into ones in the same coordinate system.

(2) If the overlapping regions of these two adjacent reconstructed images completely coincide with each other, the following relation is established for the overlapping regions:

$$Z = \Psi_k(x, y) \atop = \Psi'_{k+1}(x', y') \atop = \Psi_{k+1}(x - x_0, y - y_0) \Bigg\} \quad (c)$$

Actually, however, it is difficult to shift the measuring operation to a next sub-area in such a manner that the interference measurement will not incur an error of, for example, $\lambda/1$ or more ($\lambda$: Wavelength of laser beam used in the measurement). Namely, the shift of measuring operation will unavoidably cause a more or less inaccuracy in the measurement. It can be considered that this error or inaccuracy occurs when the reconstructed image represented by the function $\Psi_{k+1}$ inclines by $\underline{a}$ in the x-direction, $\underline{b}$ in the Y-direction and is displaced by $\underline{c}$ in the Z-direction in relation to the reconstructed image represented by the function $\Psi_k$ in the three-dimensional space as shown in FIG. 12. Therefore it can be regarded that the following relation (will be referred to as "equation of coordinate transformation" hereinafter) is established between these functions:

$$Z = \Psi_k(x, y) \quad (d)$$

$$Z' = \Psi'_{k+1}(x', y') + ax + by + c \atop = \Psi_{k+1}(x - x_0, y - y_0) + ax + by + c \Bigg\} \quad (e)$$

To join the reconstructed images represented by the functions $\Psi_k$ and $\Psi_{k+1}$ to each other as contiguously as possible, the errors of the functional values (Z, Z') at a same point the functions share in the overlapping regions (will be referred to as "shared point" hereinafter) must be minimized.

The method of least squares is used to determine the coefficients $\underline{a}$, $\underline{b}$ and $\underline{c}$ in the above equation (e) in order to minimize the difference between these functional values, that is, the difference $\sigma = Z - Z'$ in height between the reconstructed images at the shared point.

(III) At the third step 4, the data of each of the reconstructed images at a number N of shared points in the overlapping regions is placed in a predetermined corrective equation which will be explained below to establish simultaneous equations for determination of unknown coefficients $\underline{a}$, $\underline{b}$ and $\underline{c}$.

That is, under the assumption that the functional values at arbitrary ones $(x_i, y_i)$ of the number N of the shared points are $Z_i$, $Z'_i$ in the functions $\Psi_k$ and $\Psi_{k+1}$, the error or difference $\sigma_i$ at that point can be obtained from the following equation (will be referred to as "corrective equation" hereinafter):

$$\sigma_i = Z_i - Z'_i \atop = \Psi_k(x_i, y_i) - [\Psi_{k+1}(x_i - x_0, y_i - y_0) + ax_i + by_i + c] \quad (f)$$

When $\Psi_k(x_i, y_i) - [\Psi_{k+1}(x_i - x_0, y_i - y_0)]$ is taken as $(x_i, y_i)$, the sum of squares of the errors $S_{ij}$ at the number N of shared points will be:

$$\sum_{i=1}^{N} \sigma_i^2 = \Sigma \Delta_i^2 + a^2 \Sigma x_i^2 + b^2 \Sigma y_i^2 + nc^2 - 2a\Sigma(x_i \Delta_i) - 2b\Sigma(y_i \Delta_i) - 2c\Sigma \Delta_i + 2ab\Sigma(x_i y_i) + 2ac\Sigma x_i + 2bc\Sigma y_i \quad (g)$$

Then, it suffices to determine the constants $\underline{a}$, $\underline{b}$ and $\underline{c}$ are determined with which $\Sigma \sigma_i^2$ takes a minimum value. Therefore, under the assumption that $\Sigma \sigma_i^2$ is a function of the constants $\underline{a}$, $\underline{b}$ and $\underline{c}$, the extreme value (minimum) of $\Sigma \sigma_i^2$, partially differentiated with the constants $\underline{a}$, $\underline{b}$ and $\underline{c}$, respectively, will be zero. Thus, the following simultaneous equations of second degree with three unknowns can be obtained:

$$\partial \Sigma \sigma_i^2 / \partial a = 2a\Sigma x_i^2 + 2b\Sigma(x_i y_i) + 2c\Sigma x_i - 2\Sigma(x_i \Delta_i) = 0 \atop \partial \Sigma \sigma_i^2 / \partial b = 2a\Sigma(x_i y_i) + 2b\Sigma y_i^2 + 2c\Sigma y_i - 2\Sigma(y_i \Delta_i) = 0 \atop \partial \Sigma \sigma_i^2 / \partial c = 2a\Sigma x_i + 2b\Sigma y_i + 2nc - 2\Sigma \Delta_i = 0 \Bigg\} \quad (h)$$

(IV) At the fourth step 5, the constants $\underline{a}$, $\underline{b}$ and $\underline{c}$ are determined ($a = a_0$, $b = b_0$, $c = c_0$) from the simultaneous equations (h) to define a following specific equation of continuity between the functions of adjacent sub-areas:

$$\Psi''_{k+1}(X, Y) = \Psi_{k+1}(X - X_0, Y - Y_0) + a_0 X + b_0 Y + c_0 \quad (i)$$

Each of the functions representative of the reconstructed images of the two adjacent sub-areas are corrected based on the above equation of continuity (i) to contiguously join the reconstructed images represented by the functions.

It should be noted that the following determinant can be used for simple calculation of the values $\underline{a}$, $\underline{b}$ and $\underline{c}$ from the simultaneous equations (h). The above simultaneous equations (h) can be expressed as follow:

$$\begin{pmatrix} \Sigma(x_i \Delta_i) \\ \Sigma(y_i \Delta_i) \\ \Sigma \Delta_i \end{pmatrix} = \begin{pmatrix} \Sigma x_i^2 & \Sigma(x_i y_i) & \Sigma x_i \\ \Sigma(x_i y_i) & \Sigma y_i^2 & \Sigma y_i \\ \Sigma x_i & \Sigma y_i & n \end{pmatrix} \begin{pmatrix} a \\ b \\ c \end{pmatrix}$$

Thus, the values $\underline{a}$, $\underline{b}$ and $\underline{c}$ are determined as follows:

$$\begin{pmatrix} a \\ b \\ c \end{pmatrix} = \begin{pmatrix} \Sigma x_i^2 & \Sigma(x_iy_i) & \Sigma x_i \\ \Sigma(x_iy_i) & \Sigma y_i^2 & \Sigma y_i \\ \Sigma x_i & \Sigma y_i & n \end{pmatrix}^{-1} \begin{pmatrix} \Sigma(x_i\Delta_i) \\ \Sigma(y_i\Delta_i) \\ \Sigma\Delta_i \end{pmatrix}$$

The important thing in these equations is that only the contents $x_i$, $y_i$ and $n$ are included in the equation of inverse matrix of $3 \times 3$ and they can be uniquely determined. Therefore by calculating the equation of inverse matrix beforehand, the constants $\underline{a}$, $\underline{b}$ and $\underline{c}$ can be mechanically calculated from the data $\Delta_i$ measured for each of the sub-areas S. At each time, the equation of continuity can be easily calculated.

By setting the shared points $(x_i, y_i)$ symmetrically around a certain point $(x_j, y_j)$, the following relation can be established and each value in the inverse matrix equation can be easily calculated:

$$\begin{cases} \Sigma x_i^2 = \Sigma (x_j \pm dx)^2 = nx_j^2 + ndx^2 \\ \Sigma y_i^2 = \Sigma (y_j \pm dy)^2 = ny_j^2 + ndy^2 \end{cases}$$

$\Sigma x_i = nx_j, \Sigma y_i = ny_j,$ $\Sigma(x_iy_i) = nx_jy_j + ndx \cdot dy$ (V) At the fifth step 6, a specific equation of continuity is determined for each sub-area from the constants $\underline{a}$, $\underline{b}$ and $\underline{c}$ obtained at the third step 4 in order to join contiguously and smoothly the overlapping regions of the reconstructed images, whereby the function representative of the reconstructed image of each sub-area can be corrected.

In the foregoing, the relation between the k-th and (K+1)th sub-areas have been described. This description is also true for other sub-areas. Namely, a specific equation of continuity is determined for each of the sub-areas in quite a same manner as having been described and the function representative of the reconstructed image of each sub-area is corrected based on the specific equation of continuity. By transforming the corrective functions obtained for these first to N-th sub-areas into ones in a same coordinate system by using a predetermined equation of coordinate transformation, an entire image F can be produced in which the reconstructed images are joined contiguously to each other with no step between sub-areas in the same coordinate system as shown in FIG. 16.

The fifth embodiment has been discussed as to the overlapping of reconstructed image between two sub-areas and continuous joining of two reconstructed images. However, the present invention is not limited to this embodiment.

In case there are overlapping regions between, for example, a number M of adjacent reconstructed images, the following number (M−1) of the equations of coordinate transformation are obtained when any of the reconstructed images is taken as a reference:

$\Psi_0(x, y) = \Psi_1(x - x_1, y - y_1) + a_1x + b_1y + c_1$ $\quad = \Psi_2(x - x_2, y - y_2) + a_2x + b_2y + c_2$ $\quad \vdots$ $\quad = \Psi_{M-1}(x - x_{M-1}, y - y_{M-1}) + a_{M-1}x +$ -continued $b_{M-1}y + c_{M-1}$ (M−1)×3 coefficients are to be determined from these equations. In this case, differences $\sigma$ are determined in the overlapping regions between the respective reconstructed images as in the aforementioned fifth embodiment. The coefficients $\underline{a}$, $\underline{b}$ and $\underline{c}$ for each sub-area is determined by the method of least squares in such a manner that the sum of the squares of the differences is minimum, hereby defining a specific equation of continuity for each sub-area.

Figure 14:
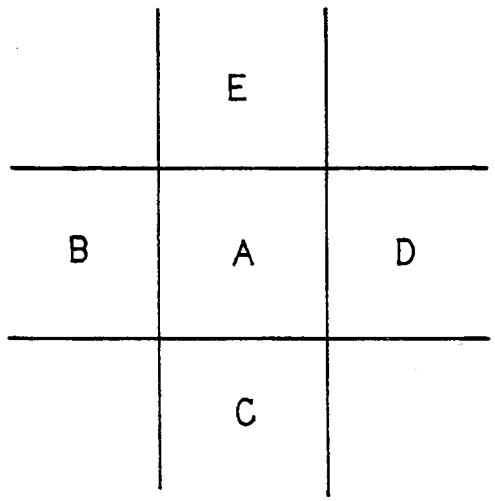
FIG. 14 is an explanatory drawing showing the distribution of the sub-areas to be joined together by another joining method according to the present invention.

In case, for example, the five reconstructed images A to E overlap each other as shown in FIG. 14, first the coefficients $a_A$, $b_A$ and $c_A$ of the function $\Psi_A$ representing the surface A are determined.

Since the surface not overlapping the surface A has no region overlapping the surface A, no square $\Sigma\sigma_i^2$ of the error is obtained. Therefore, the square $\Sigma\sigma_i^2$ has only to be obtained of the surfaces B, C, D and E.

For the surface B, for example, the following equation is obtained and also a similar equation is obtained for each of the surfaces C, D and E.

$$\underset{AB}{\Sigma\sigma_i^2} = \Sigma[\Psi_{Bi} + a_Bx_i + b_By_i + C_B - (\Psi_{Ai} + a_Ax_i + b_Ay_i + c_A)]^2$$

Therefore, the sum of these squares $\Sigma\sigma_i^2$, namely, the following equation is partially differentiated with $a_A$, $b_A$ and $c_A$, respectively.

$$\sigma_A^2 = \underset{AB}{\Sigma\sigma_i^2} + \underset{AC}{\Sigma\sigma_i^2} + \underset{AD}{\Sigma\sigma_i^2} + \underset{AE}{\Sigma\sigma_i^2}$$

However, there exists a following relation:

$$\partial\{\underset{AB}{\Sigma\sigma_i^2} + \underset{AC}{\Sigma\sigma_i^2} + \underset{AD}{\Sigma\sigma_i^2} + \underset{AE}{\Sigma\sigma_i^2}\}/\partial a_A =$$

$$\underset{AB}{\partial\Sigma\sigma_i^2/\partial a_A} + \underset{AC}{\partial\Sigma\sigma_i^2/\partial a_A} + \underset{AD}{\partial\Sigma\sigma_i^2/\partial a_A} + \underset{AE}{\partial\Sigma\sigma_i^2/\partial a_A}$$

This relation is also applicable to $b_A$ and $c_A$. Assume as follows, and the values $a_A$, $b_A$ and $c_A$ thus obtained are correct if the surfaces B, C, D and E are correct:

$$\begin{pmatrix} \underset{AB}{\Sigma x_i\Delta_i} \\ \underset{AB}{\Sigma y_i\Delta_i} \\ \underset{AB}{\Sigma\Delta_i} \end{pmatrix} = \qquad\qquad (j)$$

$$\underset{AB}{\Sigma} \begin{pmatrix} \underset{AB}{\Sigma x_i^2} & \underset{AB}{\Sigma(x_iy_i)} & \underset{AB}{\Sigma x_i} \\ \underset{AB}{\Sigma(x_iy_i)} & \underset{AB}{\Sigma y_i^2} & \underset{AB}{\Sigma y_i} \\ \underset{AB}{\Sigma x_i} & \underset{AB}{\Sigma y_i} & n \end{pmatrix} = \underset{AB}{\Sigma} \begin{pmatrix} a_A \\ b_A \\ c_A \end{pmatrix} = A$$

Actually, however, the surfaces B, C, D and E must also be corrected. In this situation, all the measured surfaces must be corrected simultaneously with respect to an appropriate reference surface. The similar coefficients to those in the above equation (i) are determined for other surfaces and can be calculated as in the aforementioned fifth embodiment.

Figure 15:
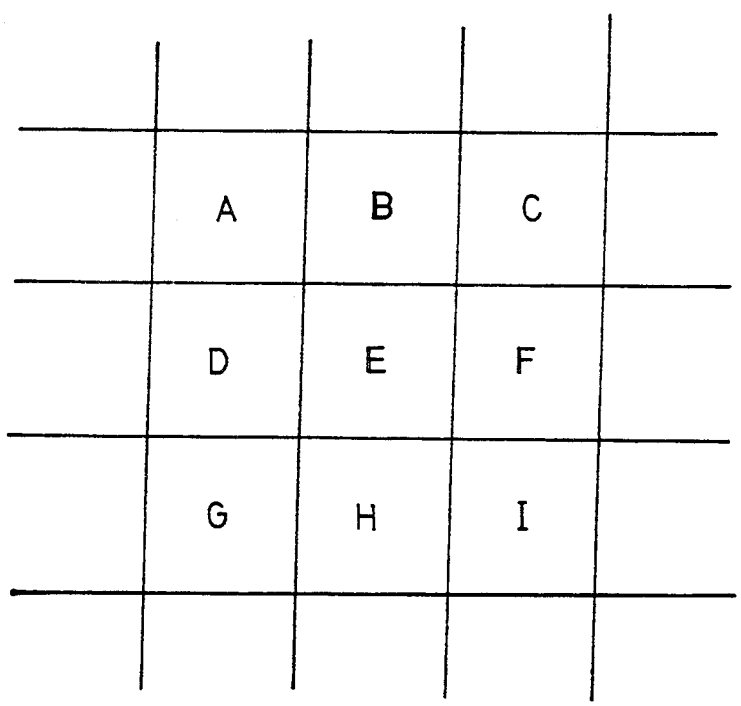
FIG. 15 is an explanatory showing the distribution of the sub-areas to be joined together by still another joining method according to the present invention.

Namely, for joining together 3×3 surfaces, that is, 8 surfaces as shown in FIG. 15, coefficients can be determined from the determinant shown below and which is established under the assumption that the surface A is taken as reference surface and $\Sigma P$ and $\Sigma Q$ are sums with surrounding surfaces, respectively (for example, $\Sigma_A = \Sigma_{AB} + \Sigma_{AD}, \Sigma_A = AB + AD,$ $\Sigma_B = AB + BC + BE, \Sigma_B = AB + BC + BE,$ etc.):

$$\begin{pmatrix} \Sigma_B \\ \Sigma_C \\ \Sigma_D \\ \Sigma_E \\ \Sigma_F \\ \Sigma_G \\ \Sigma_H \\ \Sigma_I \end{pmatrix} = \begin{pmatrix} \Sigma_B & BC & 0 & BE & 0 & 0 & 0 & 0 \\ BC & \Sigma_C & 0 & 0 & CF & 0 & 0 & 0 \\ 0 & 0 & \Sigma_D & DE & 0 & DG & 0 & 0 \\ DE & 0 & DE & \Sigma_E & EF & 0 & EH & 0 \\ 0 & CF & 0 & EF & \Sigma_F & 0 & 0 & PI \\ 0 & 0 & DG & 0 & 0 & \Sigma_G & EH & 0 \\ 0 & 0 & 0 & EH & 0 & GH & \Sigma_H & HJ \\ 0 & 0 & 0 & 0 & Q_{FI} & 0 & HI & \Sigma_I \end{pmatrix} \begin{pmatrix} B \\ C \\ D \\ E \\ F \\ G \\ H \\ I \end{pmatrix}$$

By determining an inverse matrix of the matrix Q, the coefficients $\underline{a}$, $\underline{b}$ and $\underline{c}$ can be determined.

In case a laser is used in the present invention, it should preferably be a He-Ne laser of 633 nm in wavelength or semiconductor laser of 880 nm in wavelength.

Figure 17:
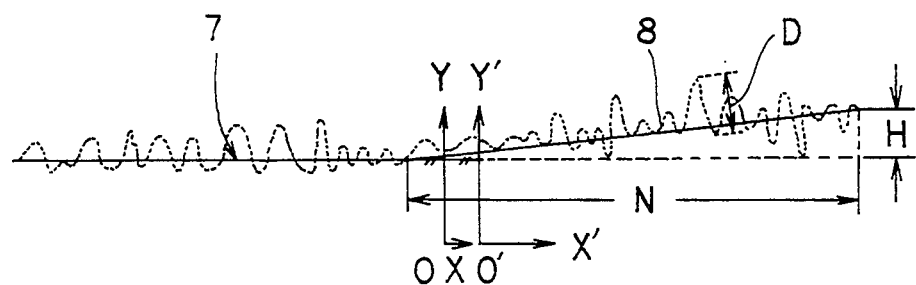
FIG. 17 is a side elevation showing the gradient of the object surface reconstructed according to the present invention.

FIG. 17 shows the method of joining the sub-areas of an object surface according to a sixth embodiment of the present invention. In this method of joining the sub-areas, the two adjacent sub-areas (will be referred to as "reconstructed images" hereinafter) 7 and 8 are joined together so that the error H caused by the gradient between the reconstructed images 7 and 8 is smaller than the mean value $\sigma_d$ of the irregularity error D of the reconstructed images 7 and 8. More specifically, the two surfaces 7 and 8 are joined so as to meet the following unequality of continuity:

$$H/\sigma_d \leq 1 \tag{k}$$

where $H = \sigma_a \cdot N$      (l)

$\sigma_a$: Mean value of gradient error
N: Length of sub-area in overlapping direction $$\sigma_a = \sqrt{24/(n^3 - n)} \cdot \sigma_d \tag{m}$$

where n: Length of overlapping area in overlapping direction

Next, the relation between the mean value $\sigma_a$ of gradient error and the mean value $\sigma_d$ of irregularity error, expressed by the equation (m), will be discussed herebelow.

Figure 18:
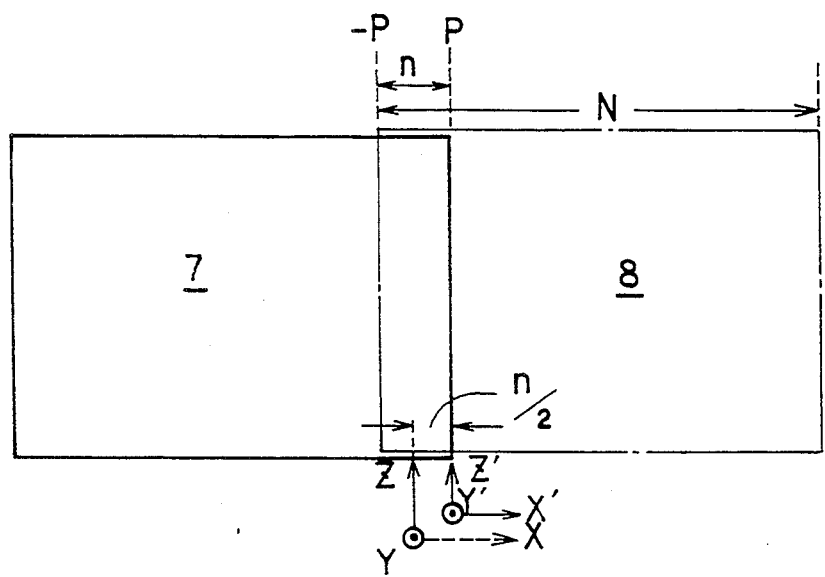
FIG. 18 is a plan view showing the overlapping of the reconstructed images in FIG. 17.

First, the reconstructed image 8 overlaps the reconstructed image by a length $\underline{n}$ as shown in FIG. 18. In the coordinate system O'-X'Y', the reconstructed image 8 is indicated with the following:

$$Y' = a'X + b$$

where
a: Gradient
b: Intercept

The gradient $\underline{a}$ of the reconstructed image 8 is determined using the method of least squares as follows:

$$a = \frac{\Sigma X'Y' - \Sigma X' \Sigma Y'}{\Sigma X'^2 - (\Sigma X')^2} \tag{n}$$

By transforming the above coordinate system into a new coordinate system O-XY shown in FIG. 17, the following relations are established:

$$X' - (n/2) = X \text{ and } Y' = Y$$

By placing these relations into the equation (n) and supposing that $P = (n-1)/2$, the following can be obtained since $\Sigma X' = 0$:

$$a = \frac{N \sum_{-P}^{P} XY}{N \sum_{-P}^{P} X^2}$$

Using the equation of dispersion, the mean value $\sigma_a$ of the gradient error can be determined as follows:

$$\sigma_a^2 = \langle (a - \bar{a})^2 \rangle \tag{o}$$

$$= \frac{\sum_{-P}^{P} X^2 2\sigma_d^2}{\left(\sum_{-P}^{P} X^2\right)^2} \left( \because \sum_{-P}^{P} \bar{X} = 0 \right)$$

where $$\sum_{-P}^{P} X^2 = 2 \sum_{X=1}^{P} X^2 = \frac{P(P+1)(2P+1)}{3}$$

$$= \frac{n^3 - n}{12} \quad (\because P = (n-1)/2)$$

-continued $$\sigma_a{}^2 = \frac{2\sigma_d{}^2}{\left(\frac{n^3-n}{12}\right)}$$

$$= \frac{24\sigma_d{}^2}{n^3-n}$$

In the foregoing, the sixth embodiment of the present invention has been described concerning the mean value of irregularity error and error caused by the gradient of reconstructed image, both in the linear direction, namely, in the Z direction. However, since there is no irregularity error of the reconstructed images in the X and Y directions, such error has not to be taken into account and so the aforementioned procedure is not necessary.

The ratio in overlapping region between the reconstructed images when the previously described equation of continuity (k) is met will be discussed herebelow.

The unequality of continuity (k) can be expressed as follows based on the relations (l) and (m):

$$[\sqrt{24/(n^3-n)}\cdot\sigma_d\cdot N]/\sigma_d \leq 1$$

The term N is a positive number since it is a length of the reconstructed image 8 in the overlapping direction. Therefore, the unequality of continuity (k) can be expressed as follows:

$$n^3-n-24N^2 \geq 0 \quad (k)'$$

By determining the length N of the reconstructed image 8 in the predetermined direction depending upon the width of the sub-area, the range of the length $\underline{n}$ of the overlapping region in the same direction is determined using the unequality of third order (k)'.

The present inventor has done various experiments and reviewed the experiment results in detail. The results of the experiments proved that the ratio in overlapping region must be limited to at least the following range:

$$0.03 \leq n/N \leq 0.3$$

This equates to the overlapping region representing an area of 3 to 30% of the sub-area.

More particularly, if the ratio is smaller than the above-mentioned lower limit, the joining of sub-areas cannot be estimated correctly, resulting in a bent joining. On the contrary, if the ratio exceeds the upper limit, only the number of measurements is uselessly increased while the joining error cannot be effectively reduced.

In case a laser is used in the present invention, it should preferably be a He-Ne laser of 633 nm in wavelength or semiconductor laser of 880 nm in wavelength.

As having been described in the foregoing, the method for divisional measurement of object surface according to the sixth embodiment of the present invention is such that the measurement region is so set for each to-be-measured sub-area as to overlap the circumferential edges of at least two adjacent sub-areas, measured data of the overlapping region are appropriately calculated and the surfaces reconstructed from the measured data of the sub-areas are corrected based on the result of calculation at a selected time, thereby contiguously joining together the boundaries between the sub-areas.

Figure 19:
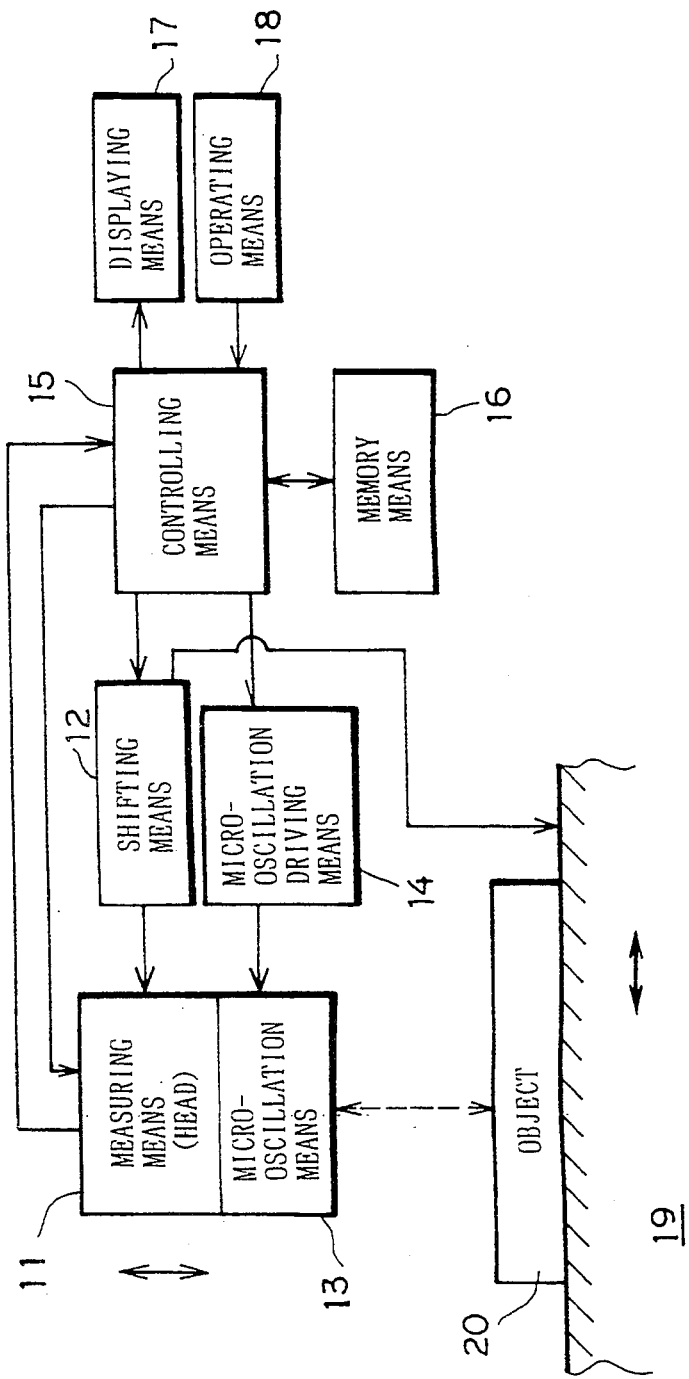
FIG. 19 is a block diagram showing the construction of a form measuring apparatus according to the present invention.

FIG. 19 shows a form measuring apparatus which carries out the method for measuring an object according to a seventh embodiment and the method for joining the sub-areas measured by that method. The form measuring apparatus comprises a measuring means 11, shifting means 12, micro-oscillation means 13, micro-oscillation driving means 14, controlling means 15, memory means 16, displaying means 17 and operating means 18. The measuring apparatus is so designed that simply turning on the start button (not shown) will provide a full automatic measurement of all the sub-areas.

The reference numeral 19 in FIG. 19 indicates a stage, and 20 an object placed on the stage 19.

Figure 20:
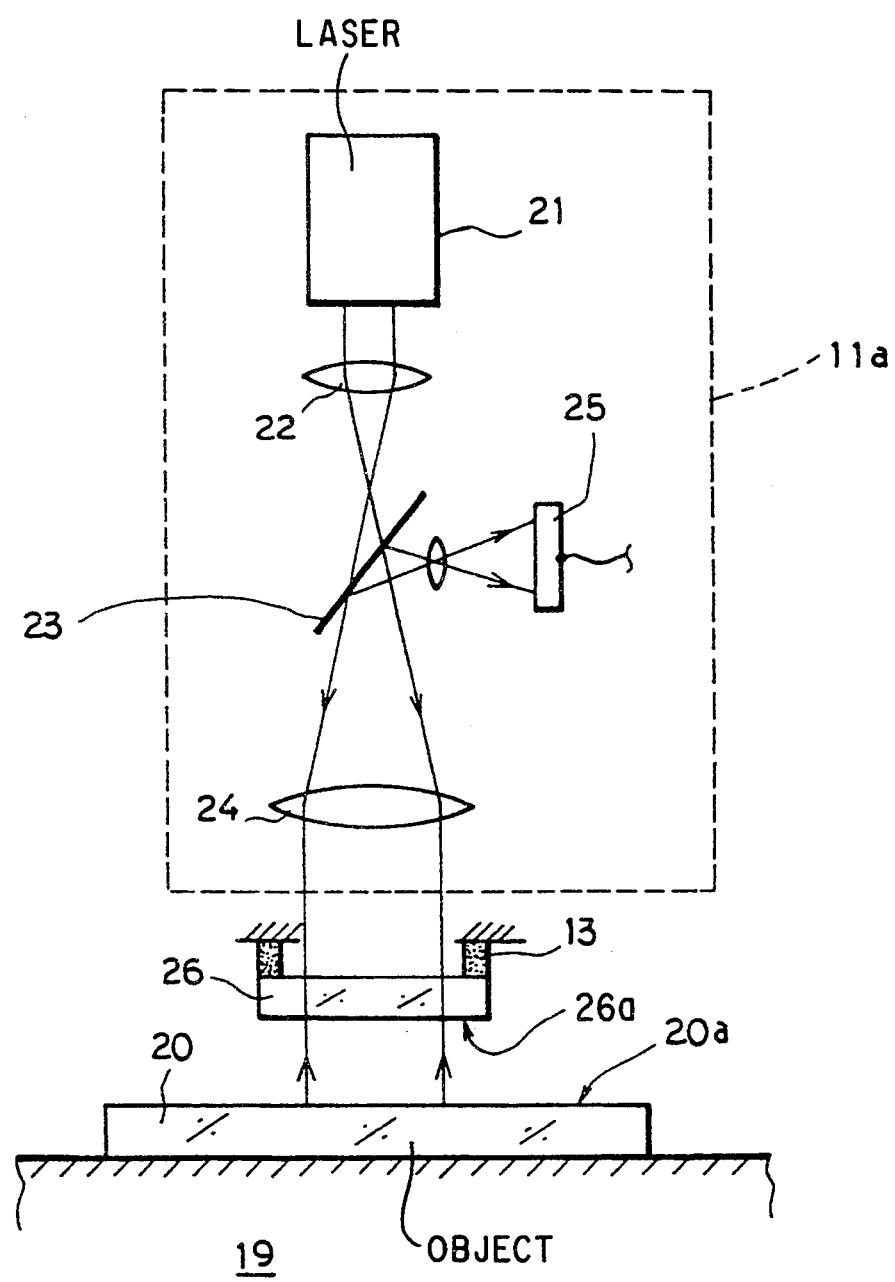
FIG. 20 is an explanatory drawing showing the optical system used in the form measuring apparatus according to the present invention.

In this embodiment, the measuring means 11 is a Fizeau type interferometer shown in FIG. 20. The Fizeau type interferometer comprises a casing for a head 11a in which a laser 21 which emits a reference beam of a predetermined wavelength, a laser guide lens 22 for guiding the laser beam emitted from the laser 21, a half mirror 23 which divides the laser beam into two beams, a collimator lens 24 which makes the emitted laser beams parallel to each other, and a CCD (charge coupling device) 25 serving as image pickup device.

A reference material (glass) 26 is mounted under the head 11a of the Fizeau type by means of the micro-oscillation means 13 which will be further described later. The reference material 26 has a reference surface 26a treated with a high precision. Parallel light beams are incident upon the reference material 26, and the light reflected at the reference surface 26a and that reflected at the object surface 20a interfere with each other to produce a contour interference fringe.

Figure 21:
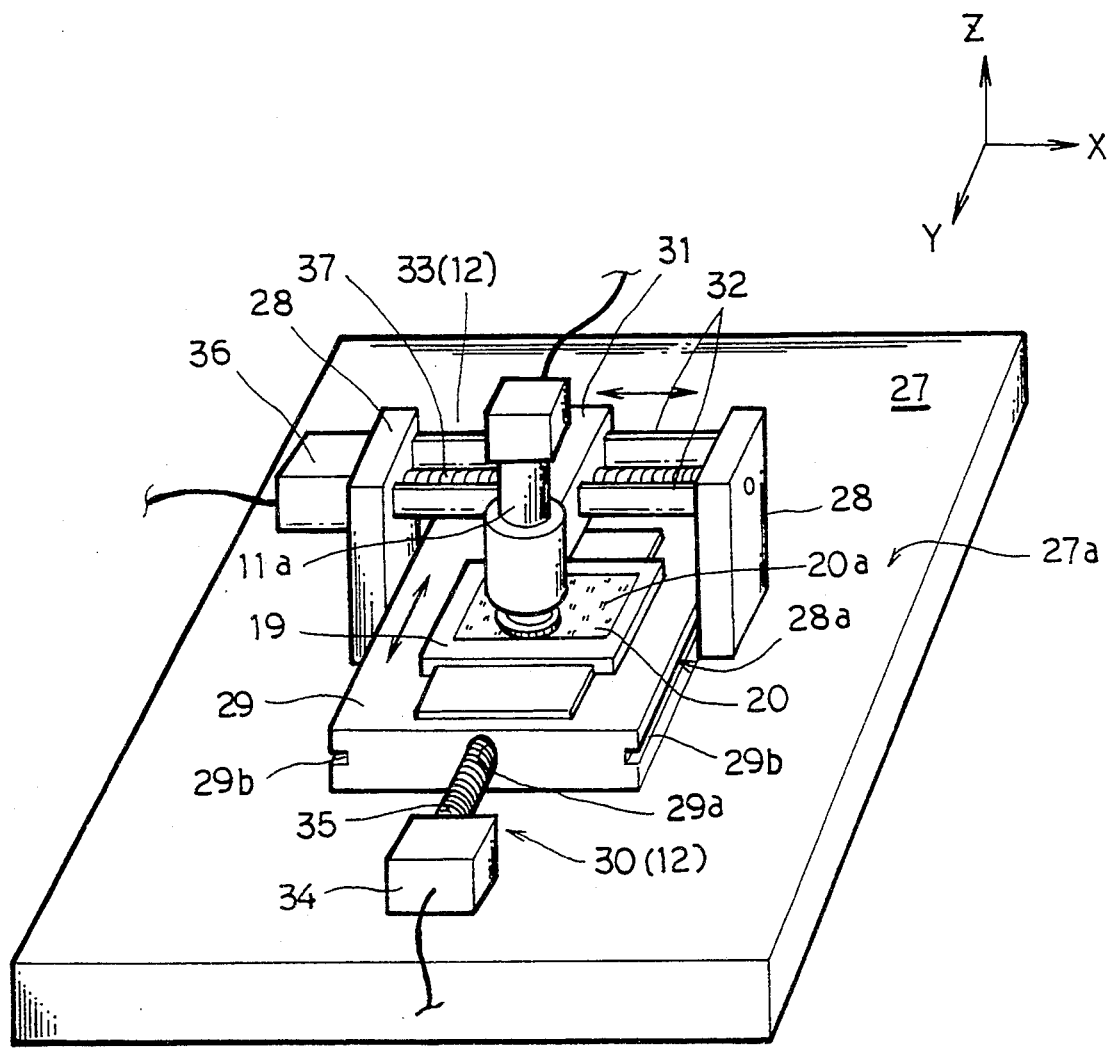
FIG. 21 is a perspective view showing the essential portion of the form measuring apparatus according to the present invention.

In the seventh embodiment, as seen in FIG. 21 the measuring means 11 used is an interferometer, and designed to produce an interference fringe from coherent light and acquire data concerning the state of the object surface 20a. However, the measuring means 11 is not limited to the interferometer. For example, a moire camera may be used instead to take such data from a moire fringe.

The shifting means 12 is provided to shift the head 11a for measurement of the state of each of the subdivided areas of the object surface 20a. The shifting means 12 in this embodiment comprises a first moving means 30 which moves a moving mount 29 on a base 27 in the Y-direction, the mount 29 having placed a stage thereon and being guided by supports 28 fixed to the base, and a second moving means 33 which moves a slider 31 along guide members 32 provided between the supports 28 in the X-direction perpendicular to the Y-direction. The first moving means 30 includes a first step motor 34 fixed to the upper surface 27a of the base with a shock absorber (not shown) provided between the motor 34 and the upper surface 27a, and a screw shaft 35 screwed in a threaded hole 29a in the moving mount 29 and which is rotated by means of the step motor 34. The first moving means 30 lets the moving mount 29 slide in the Y direction while the projections 28a of the supports 28 are guiding the guide recesses 29b formed on the opposite sides of the moving mount 29. On the other hand, the second moving means 33 includes a second step motor 36 disposed laterally as fixed to the supports 28 with a shock absorber (not shown) provided between the motor 36 and the supports 28, and a screw shaft 37 which rotates in the threaded hole (not shown) formed in the slider 31. The shifting means is not limited to that used in this embodiment, but may be, for example, a rack and pinion or the like.

The micro-oscillation means 13 is provided under the head 11a and driven by the micro-oscillation driving means 14 to provide a micro-oscillation of the head 11a in the Z direction. More specifically, the micro-oscillation means 13 used in this embodiment is a piezoelectric element and oscillates the head 11a an amount nearly same as the wavelength used under the piezoelectric effect.

The controlling means 15 is a microprocessor, and acquires specific data of each sub-area measured by the measuring means as shown in FIG. 19, makes a main calculation of the measured data in order to reconstruct the surface, and also makes an additional calculation for continuous joining the adjacent ones of the reconstructed images, thereby partially correcting the measured data. More particularly, the controlling means in this embodiment has the output thereof connected to the output of the CCD 25 for input of the specific data of each sub-area supplied from the CCD 25 in the measuring means 11. Also, the controlling means 15 is connected to the memory means 16 in order to supply to the memory means a corrective data consisting of the data after subject to the main calculation based on the input data and the corrected data after the additional calculation. Furthermore, the controlling means 15 has the output thereof connected to the input of the displaying means 17 in order to take out the data supplied to the memory means 16 and display a reconstructed image of the entire object surface. The controlling means 15 is also connected at the output thereof to the inputs of the laser 21 in the head 11a (FIG. 20), shifting means 12 and micro-oscillation driving means 14 to activate them at predetermined times and for predetermined times, respectively.

The memory means 16 is provided to store along with the sub-area number the data of the reconstructed image of each sub-area of the object surface as well as a part of the above data, that is corrected concerning the overlapping region, for contiguous joining of the adjacent ones of the reconstructed images, the corrected data being used for the above-mentioned correction. The memory means 16 also stores the flow of operations to be effected under the control of the controlling means 15 and which will be described later with reference to FIG. 22.

The displaying means 17 displays surfaces of sub-areas, reconstructed based on the corrective data stored in the memory means 16 and also an image of the entire object surface, reconstructed by joining the reconstructed images of sub-areas. It comprises a CRT which displays the reconstructed sub-area surfaces and reconstructed object surface on the screen thereof, and a printer which provides a hard copy of the reconstructed images.

The operating means 18 operates the controlling means 15 and displaying means 17 as shown in FIG. 19. It includes a keyboard and mouse by which sub-areas to be displayed on the displaying means 17 are selected.

Figure 22:
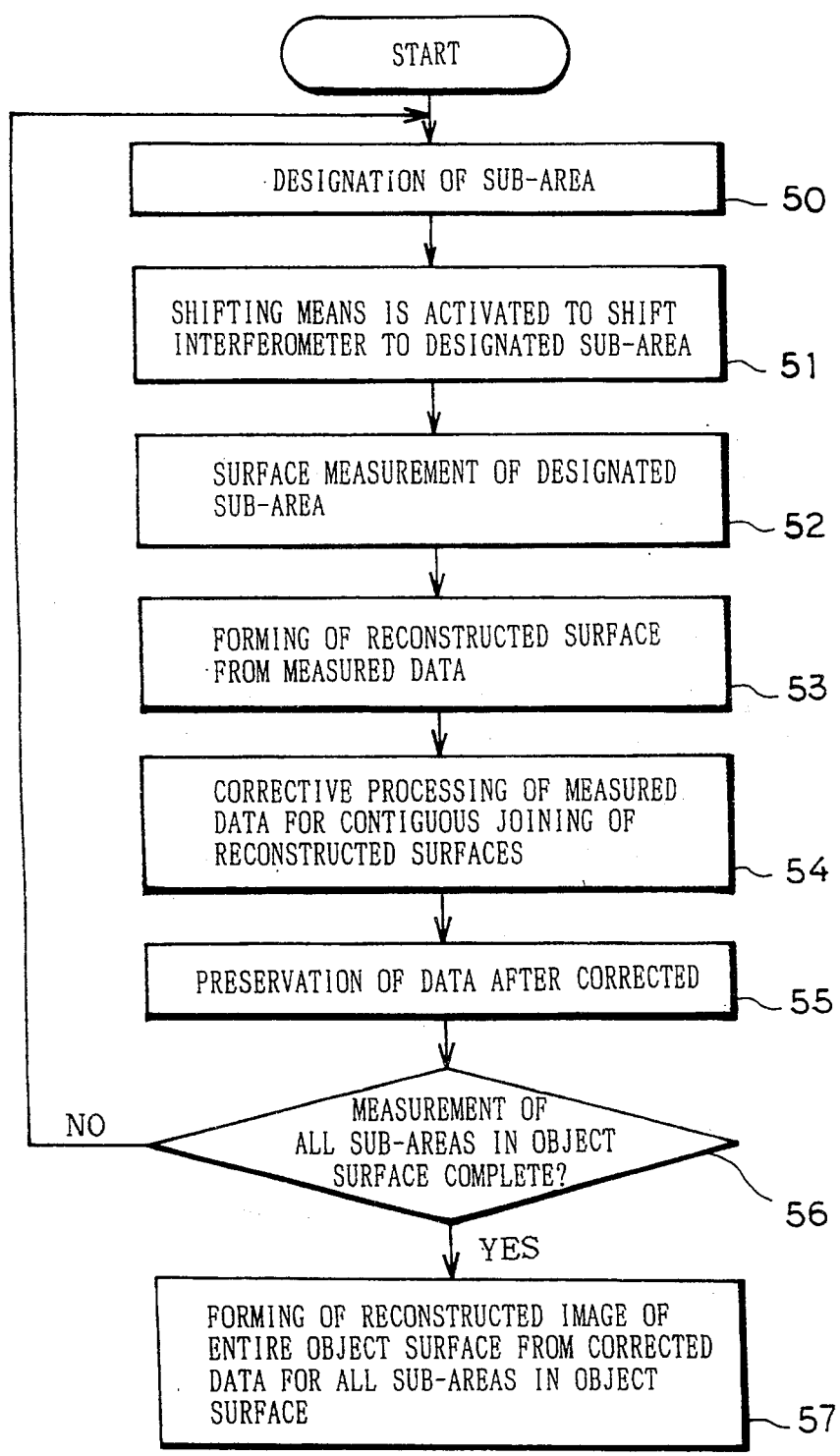
FIG. 22 is a flow chart showing the operations of the form measuring apparatus according to the present invention.
Figure 23:
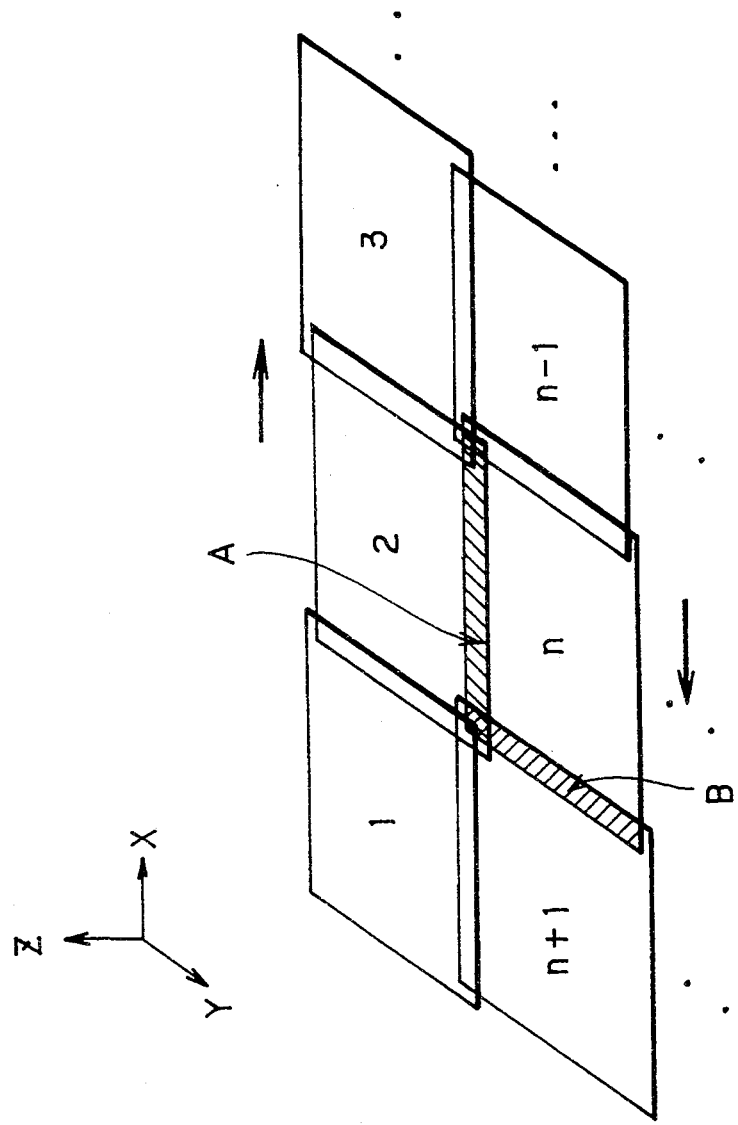
FIG. 23 is an explanatory drawing showing the measuring operations of the form measuring apparatus according to the present invention.

The form measuring apparatus according to the seventh embodiment functions as will be described herebelow with reference to the flow chart shown in FIG. 22. As shown in FIG. 23, when a sub-area No. n, for example, is measured, the overlapping regions A and B of the sub-area No. 2 above the sub-area No. n and sub-area No. n+1 to the left are subject to an additional calculation for joining of their reconstructed images. However, setting of the overlapping regions is not limited to that shown here, but appropriate overlapping regions can be optimally set according to an object surface to be measured.

(1) First, an object surface is divided into a plurality of sub-areas, these sub-areas are numbered, and the sub-area numbers are stored into the memory means 16 under the control of the controlling means 18 (at the first step 50).

(2) Next, when the operating means 18 is operated in a predetermined manner, for example, when the start key (not shown) on the keyboard is pressed, the shifting means 12 is put into operation under the control of the controlling means 15. Namely, the shifting means 12 shifts the head 11a to an area of the sub-area No. 1 (at the second step 51).

(3) Further, the laser 21 is activated by means of the controlling means 15 and emits a laser beam of a predetermined wavelength toward the area of the sub-area No. 1. The laser beam returning as reflected at the surface within the area and the laser beam also returning as reflected at the reference face 26a (FIG. 20) of the reference material 26 interfere with each other to produce an interference fringe which in turn will be picked up by the CCD 25 (at the third step 52). Note that the micro-oscillation means 13 provides a micro-oscillation of a wavelength of about in the Z-direction by means of the micro-oscillation driving means 14.

(4) The image data picked up by the CCD 25 within the head 11a at the third is delivered to the controlling means 15 where it is subject to a predetermined main calculation to produce a reconstructed image. The resultant data for production of the reconstructed image is supplied to the memory means 16 where it is stored along with the corresponding sub-area number at a predetermined address (at the fourth step 53).

(5) For the overlapping region between the previously measured sub-area and a sub-area under measurement, the existing data and a newly obtained one are subjected to a predetermined additional calculation (method of least squares or the like) and the reconstructed images of the overlapping regions are contiguously joined together (at the fifth step 54), and the data are stored at the sixth step 55.

However, since the sub-area No. 1 initially measured has no overlapping region yet, the operation now goes to the seventh step 56. If the measurement of all sub-areas is not complete at this time, the routine jumps back to step 50, as illustrated.

(6) Thus, the corrective data obtained at the fifth step 54 including the data destined for display of the reconstructed images of non-overlapping region and overlapping region and corrected data for them are delivered along with the sub-area numbers to the memory means 16 where they are stored at a predetermined address (at the sixth step 55).

(7) Thus, the series of operations at the first to sixth steps 50 to 55 is completed here. Namely, the measurement of the area of the sub-area number is over (at the seventh step 56). Then, the same procedure of measuring operation is automatically done in the area of a next sub-area number by jumping back from the seventh step to the first step for so long as all sub-areas have not been measured as determined in step 56. When the measurement is completed with the area of the last sub-area number is over, the operation goes to the eighth step 57 in response to an affirmative execution of step 56.

(8) The corrective data obtained for all the sub-areas are calculated to produce an image of the entire object surface, namely, a reconstructed image, which will be displayed on the CRT screen or printed out from the printer here (at the eighth step 57).

In case a laser is used in the present invention, it should preferably be a He-Ne laser of 633 nm in wavelength or semiconductor laser of 880 nm in wavelength.

Figure 24:
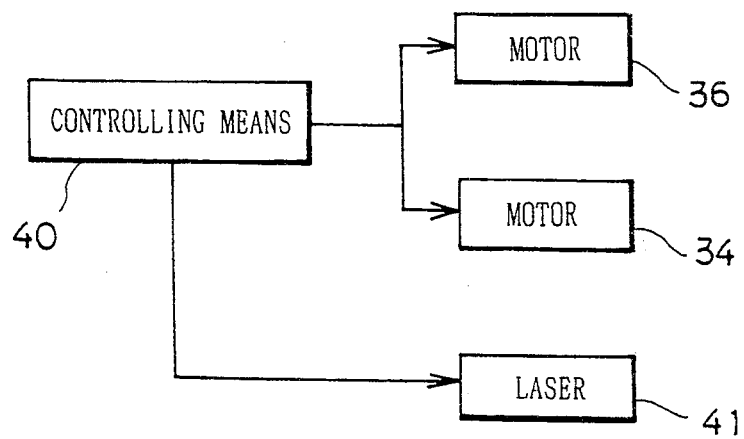

Next, the form measuring apparatus according to an eighth embodiment of the present invention will be described hereinbelow. When the control button (not shown) is pressed by the operator, the measuring means is semi-automatically shifted to each of the sub-areas. The apparatus has a controlling means 40 (FIG. 24) in addition to the similar base 27, moving mount 29, measuring head 11a and shifting means 12 to those in the seventh embodiment.

The base 27 is a flat plate of which both the upper and lower surfaces are mirror-finished to have a high flatness. In this embodiment, the base 27 is provided with a rubber cushion (not shown) for absorbing vibration at each of the four corners of the lower surface thereof which is in contact with the floor surface. The base 27 has an upper surface 27a (will be referred to as "reference surface" hereinafter) on which a pair of supports 28 is fixed. In addition, a moving mount 29 is provided as slidably supported between the supports 28. Also a pair of guide bars 32 is provided at the upper portion between the supports 28 in pair.

The moving mount 29 also has both the upper and lower surfaces thereof mirror-finished to have a high flatness. The moving mount 29 has formed on opposite sides thereof recesses 29b in which projections 28a of the supports 28 are engaged and which serve as guide for movement of the moving mount 29. Also the moving mount 29 has formed therein a threaded hole 29a parallel to the recesses 29b and in which a screw shaft 35 of the shifting means 12 which will be further described later. There is mounted precisely in place on the upper surface of the stage 19 of the moving mount 29 an object of which the surface 20a is to be measured.

The measuring head 11a is mounted on a slider 31 which is slidable in the X-direction along the guide bars 32 between the supports 28. There are provided within the head casing a light source 41 (FIG. 24), measuring means and other optical system (both not shown). The light source 41 is a He-Ne laser and projects a laser beam (reference light) of a wavelength toward the object surface 20a. The measuring means picks up an interference fringe formed correspondingly to the surface state of the object surface 20a upon which the laser beam is incident. In this embodiment, a CCD is used as the measuring means and the interference fringe is recorded in a recording means (not shown). The means built in the measuring head to form an interference fringe may not use any coherent light but it may be a xenon lamp or the like which emits ordinary light for forming a moire fringe.

Figure 25:
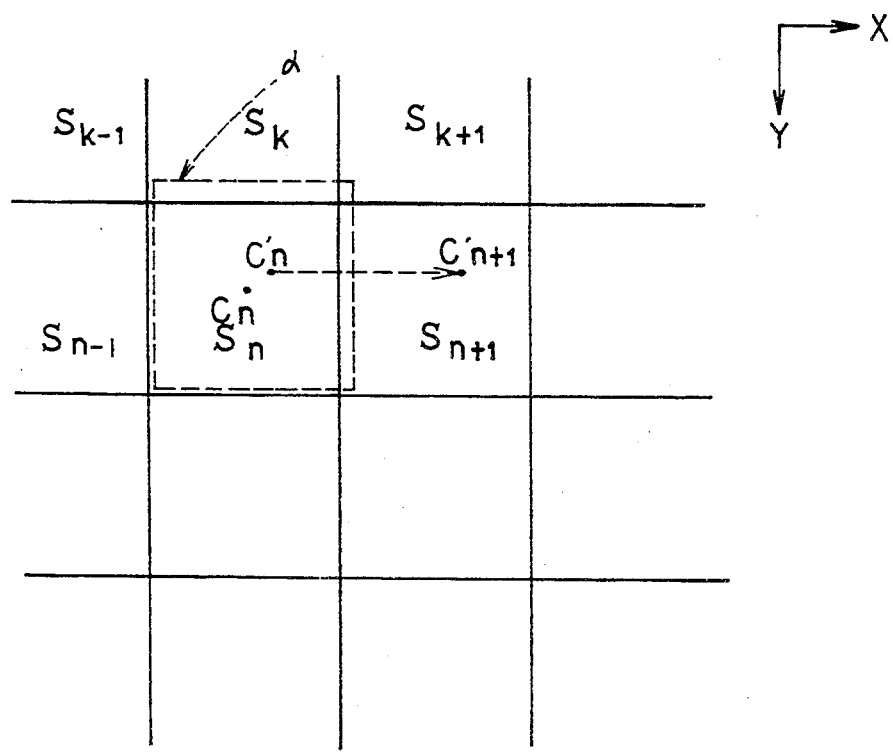
FIG. 25 is an explanatory drawing showing the areas of each object surface which are to be measured by a measuring head according to the present invention.

As seen in FIG. 25, shifting means 12 gradually shifts the center of the measuring head 11a to each of the sub-areas of the object surface 20a. According to this embodiment, when the n-th sub-area $S_n$, for example, is measured, the shifting means 12 shifts the center $C'_n$ of the measuring head to a position slightly off the center $C_n$ of the sub-area $S_n$ so that a part of the measurement region $\alpha$ of the sub-area $S_n$ overlaps the adjacent sub-areas, namely, the sub-areas $S_k$, $S_{k+1}$ and $S_{n+1}$. For rapid and accurate shifting, the shifting means 12 in this embodiment comprises a first moving means 30 to shift the measuring head in the Y direction and a second moving means 33 to shift the measuring head in the X-direction perpendicular to the Y-direction.

The first moving means 30 comprises a step motor 34 fixed to the reference surface 27a, and a screw shaft 35 driven by the step motor 34.

The second moving means 33 comprises a step motor 36 fixed to the supports 28, and a screw shaft 37 driven by the step motor 36. The screw shaft 37 is screwed in a threaded hole formed near the center of the slider 31.

The controlling means 40 is provided to control the light source 41 as well as the operation of the first and second moving means 30 and 33, and the step motors 34 and 36. For shifting the measuring head 11a in the main scanning direction, that is, in the X-direction, the step motor 36 is driven for a predetermined time at every predetermined time intervals, and for shifting the moving mount 29 in the sub-scanning direction, that is, in the Y direction, the step motor 34 is driven for a predetermined time at every predetermined time intervals.

Thus, according to the eighth embodiment, the first and second moving means 30 and 33 are efficiently driven. Namely, since the main and sub scans are done by the second and first moving means 33 and 30, respectively, the measuring head 11a can be rapidly shifted to a selected position. In this embodiment, the moving mount and measuring head are provided movably, respectively, but one of them may be fixed while the other may be moved two-dimensionally. Furthermore, the present invention is applicable for use with a moire camera as well as an interferometer.

In case a laser is used in the present invention, it should preferably be a He-Ne laser of 633 nm in wavelength or semiconductor laser of 880 nm in wavelength.

By the method of joining sub-areas according to the present invention, each sub-area is measured with its circumferential edge overlapping those of the adjacent sub-areas and then the measurement is shifted to a next sub-area and done in the same manner. The measurement is repeatedly done until the last sub-area is measured. The information obtained through these measurements is calculated to obtain a reconstructed image of each sub-area. An error between the reconstructed images at a selected point within the overlapping regions of the reconstructed images is calculated and the reconstructed images are corrected for the error to be minimized. Thus, the reconstructed images are joined together for contiguous joining between them, so it is possible to provide reconstructed images having a phase distribution infinitely approximate to the actual object surface.

Also by the method of joining sub-areas according to the present invention, the reconstructed images are so joined together that the error caused by the gradient between the reconstructed images to be joined is smaller than the mean value of the irregularity error of the reconstructed images obtained from the measured data of the sub-areas, namely, the reconstructed images are joined smoothly and contiguously to each other, thereby providing an accurately reconstructed image of the entire object surface. Thus, the state of an object surface having a larger area than the measuring aperture of a form measuring apparatus can be accurately measured.

In the form measuring apparatus according to the present invention, the shifting means is activated under the control of the controlling means to shift the measuring head into a selected one of the sub-areas of an object surface, the measuring means measures the state of the surface of the sub-area, and the controlling means calculates the data acquired with the measurements in main calculation to determine data which can be used to reconstruct a surface for display. Further, a predetermined additional calculation is done one sub-area after another for contiguous joining of the overlapping regions of the reconstructed images. The corrective data thus obtained is stored into the memory means. When such corrective data have been obtained for the entire object surface, they are used to contiguously join the reconstructed images, thereby providing a stepless, contiguous reconstructed image. This reconstructed image is displayed on the displaying means. Thus, it is possible to measure a larger object surface than the lens aperture of a measuring apparatus. The object surface can be measured wholly and continuously without any discontinuity at the boundary between the measurement regions. Namely, the measurement can be done for minimum difference in state between the reconstructed image and actual object surface. In other words, it is possible to reconstruct a surface infinitely approximate to the actual surface.

Furthermore, in the form measuring apparatus according to the present invention, the shifting means can be rapidly activated under the electrical control of the controlling means to mechanically shift the measuring head to predetermined positions in an object surface one after another. Thus, different from the manual shifting in the conventional apparatus of this kind, the form measuring apparatus according to the present invention can measure contiguously and accurately an object surface having a larger width than the measuring aperture of the apparatus. The measurement can be done extremely smoothly and rapidly.

We claim:

1. An improved method for divisional measurement of an object, having a surface wider than a measuring aperture of a form measuring means, by measuring each of a plurality of sub-areas resulting from division of the object surface, wherein the improvement comprises the steps of setting each of the sub-areas so as to partially overlap the peripheral edges of the adjacent sub-areas; effecting a predetermined measurement of each of the sub-areas; and calculating mathematically images of each of the adjoining sub-areas from data of said predetermined measurement to join said images of adjacent sub-areas.

2. The method of claim 1, wherein the step of setting each of the sub-areas so as to partially overlap the peripheral edges of the adjacent sub-areas comprises effecting a predetermined measurement and a calculation of each of the sub-areas; and effecting a further predetermined measurement and calculation of a region including peripheral parts of the adjacent sub-areas.

3. An improved method for joining together measured sub-areas of an object to compose the state of the whole object surface in which the object surface is imaginarily divided into a plurality of sub-areas, the state of each of the sub-areas is measured and then the sub-areas thus measured are joined together to compose th estate of the whole object surface, wherein the improvement comprises the steps of joining the measured sub-areas together in such a manner that the error caused by the gradient between reconstructed sub-areas joined together is smaller than or equal to the mean value of the irregularities of the sub-areas reconstructed from the measured data of the object surfaces within the sub-areas.

4. A method according to claim 3, wherein the measured sub-areas are joined together in such a manner that the adjacent ones of the sub-areas are superposed on each other within a range of 3% to 30% in area of each of the sub-areas.

5. An improved method for joining together measured sub-areas of an object to compose the state of the whole object surface in which the object surface is imaginarily divided into a plurality of sub-areas, the state of each of the sub-areas is measured and then the sub-areas thus measured are joined together to compose the state of the whole object surface, wherein the improvement comprises the measured sub-areas being joined together mathematically in such a manner that the error caused by the gradient between the reconstructed sub-areas joined together is smaller than or equal to the mean value of the irregularities of the sub-areas reconstructed from the measured data of the object surfaces within the sub-areas.

6. A method according to claim 5 wherein the measured sub-areas are joined together mathematically in a manner that the adjacent ones of the sub-areas are superposed on each other within a range of 3% to 30% in area of each of the sub-areas.

* * * * *